US008358568B2

United States Patent
Kishigami et al.

(10) Patent No.: US 8,358,568 B2
(45) Date of Patent: Jan. 22, 2013

(54) OPTICAL DISC REPRODUCTION POWER SETTING METHOD, OPTICAL DISC REPRODUCTION METHOD, AND OPTICAL DISC DEVICE

(75) Inventors: Tomo Kishigami, Tokyo (JP); Koichi Ikuta, Tokyo (JP); Nobuo Takeshita, Tokyo (JP); Yoshihiro Kiyose, Tokyo (JP); Yusuke Kanatake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/203,799

(22) PCT Filed: Apr. 7, 2010

(86) PCT No.: PCT/JP2010/002546
§ 371 (c)(1),
(2), (4) Date: Aug. 29, 2011

(87) PCT Pub. No.: WO2010/116734
PCT Pub. Date: Oct. 14, 2010

(65) Prior Publication Data
US 2011/0317534 A1   Dec. 29, 2011

(30) Foreign Application Priority Data
Apr. 10, 2009   (JP) .................................. 2009-096138

(51) Int. Cl.
*G11B 7/00* (2006.01)

(52) U.S. Cl. ...................... 369/53.26; 369/47.5; 369/116
(58) Field of Classification Search ................. 369/47.5, 369/53.26, 116
See application file for complete search history.

(56) References Cited

U.S. PATENT DOCUMENTS

| 7,133,344 | B2* | 11/2006 | Yano et al. | 369/53.26 |
| 2004/0114482 | A1* | 6/2004 | Yano et al. | 369/47.52 |
| 2007/0247988 | A1 | 10/2007 | Kikukawa et al. | |
| 2010/0110866 | A1 | 5/2010 | Takeshita et al. | |

FOREIGN PATENT DOCUMENTS

| JP | 11-134653 A | 5/1999 |
| JP | 2001-34944 A | 2/2001 |
| JP | 2002-230778 A | 8/2002 |
| JP | 2003-6941 A | 1/2003 |
| JP | 2007-293976 A | 11/2007 |
| JP | WO 2006/139784 A1 | 11/2008 |

\* cited by examiner

*Primary Examiner* — Wayne Young
*Assistant Examiner* — Brenda Bernardi
(74) *Attorney, Agent, or Firm* — Birch, Stewart, Kolasch & Birch, LLP

(57) ABSTRACT

According to a method for setting the laser beam power applied to reproduce information recorded on an optical disc, information recorded in a region on the optical disc is reproduced using three or more test reproduction powers (S22B), the number of reproductions until the degradation of the quality of the reproduced signal reaches a prescribed value is determined as the degradation number of reproductions (S22F), the relation between the test reproduction power and the degradation number of reproductions is approximated by a curve, and a reproduction power restricting the degradation of the reproduced signal quality to a predetermined amount or less over a certain guaranteed number of reproductions is determined (S25F). In optical reproduction from an optical disc on which information is recorded, the optimum power of irradiation for reproduction can be set, and degradation of the information due to the reproducing light can be prevented.

20 Claims, 17 Drawing Sheets

LASER POWER : LOW    LASER POWER : MEDIUM    LASER POWER : HIGH

| TEMPERATURE (°C) | MINIMUM VALUE OF MAXIMUM REPRODUCTION POWER (mW) |
|---|---|
| 0 | 0.362 |
| 20 | 0.346 |
| 40 | 0.328 |
| 60 | 0.302 |

OPTICAL DISC REPRODUCTION POWER SETTING METHOD, OPTICAL DISC REPRODUCTION METHOD, AND OPTICAL DISC DEVICE

FIELD OF THE INVENTION

The present invention relates to a method of setting the reproduction power (amount of reproducing light) of a laser that irradiates an optical disc to reproduce information therefrom, and an optical disc reproduction method and optical disc device using this method, with the object of holding the amount of degradation of the information on the optical disc due to the reproducing light to within a prescribed range.

BACKGROUND ART

There are two conflicting requirements on the reproduction power used in reproduction of information from an optical disc. From the viewpoint of reproduced signal quality, reproduction with the highest possible power is advantageous because noise is reduced. From the viewpoint of the ability of the optical disc to withstand the reproduction power, however, and the viewpoint of the life span of the semiconductor laser, reproduction with the lowest possible power is advantageous. To meet these conflicting requirements, it is desirable to reproduce at a reproduction power setting that can guarantee a minimum reproduced signal quality while avoiding degradation of the characteristics of the recorded marks on the optical disc and enabling the optical disc to be used as long as possible.

In a conventional optical disc device, when still reproduction is carried out, that is, when the same track is repetitively reproduced, the track suffers much thermal damage and the recorded marks constituting the recorded information in the track degrade, resulting in degradation of reproduced signal quality. An existing remedy to this problem is to detect the amplitude of the reproduced signal during still reproduction and control the reproduction power so as to correct for fluctuations in the amplitude of the reproduced signal (See Patent Document 1, for example).

PRIOR ART REFERENCES

Patent Documents

Patent document 1: Japanese Patent Application No. 2001-34944 (pp. 1-6, FIG. 9)

SUMMARY OF THE INVENTION

Problem to be Solved by the Invention

In the above conventional optical disc device, only fluctuations in the amplitude of the reproduced signal are detected, so that significant degradation of the recorded marks may go undetected and in some cases the recorded marks may be degraded to the extent that they cannot be reproduced. In addition, when fluctuations in the amplitude of the reproduced signal are detected by use of a user area that is reproduced to display a still image on the optical disc as described in the above patent document 1, there is a possibility that recorded marks necessary to the user may be degraded to the extent that they cannot be reproduced.

Assuming that the useful life of the optical disc ends when reproduction becomes impossible due to the degradation of the recorded marks, use of the commonly employed Arrhenius plot (a method used to predict life in accelerated testing) to predict disc life can be considered. However, when reproduction power is substituted for the temperature loads applied in general accelerated testing and life span is defined as the reproducing time until reproduction quality reaches a set tolerance limit, the problem arises that the relation between reproduction power and reproducing time until reproduction quality reaches the set tolerance limit is nonlinear, so that the Arrhenius plot cannot be used.

This invention addresses the above problem with the object of efficiently determining a maximum reproduction power that guarantees a prescribed reproduction time or a prescribed number of reproductions even in repetitive reproduction from an optical disc.

Means for Solving the Problem

In optical disc reproduction power setting method for determining a reproduction power setting in an optical disc reproduction method for reproducing information from an optical disc by irradiating the optical disc with laser light, the present invention provides an optical disc reproduction power setting method comprising:

a test reproduction step for carrying out test reproduction of an area in which information is recorded on the optical disc, using a test reproduction power higher than a laser light reproduction power used in reproduction from the optical disc;

a life-span index calculating step for determining a reproduction time or reproduction count until reproduced signal quality degrades to a prescribed value in the test reproduction step as a life-span index; and a reproduction power determining step for determining, as an optimum reproduction power, from a relation between the life-span index and the test reproduction power when test reproduction is carried out using at least three mutually differing test reproduction powers, a laser light power such that even if reproduction from the optical disc is carried out for a prescribed time or count, an amount of degradation of the reproduced signal is equal to or less than the prescribed value, and using this power as a reproduction power setting; wherein the reproduction power determining step determines the optimum reproduction power by using the life-span index and at least three mutually differing test reproduction powers such that a relation between a logarithm of the life-span index and the test reproduction power is nonlinear.

Effect of the Invention

According to the present invention, the optimum laser power value (amount of light) used to reproduce information from an optical disc can be determined in a short time.

MODE FOR CARRYING OUT THE INVENTION

First Embodiment

Figure 1:
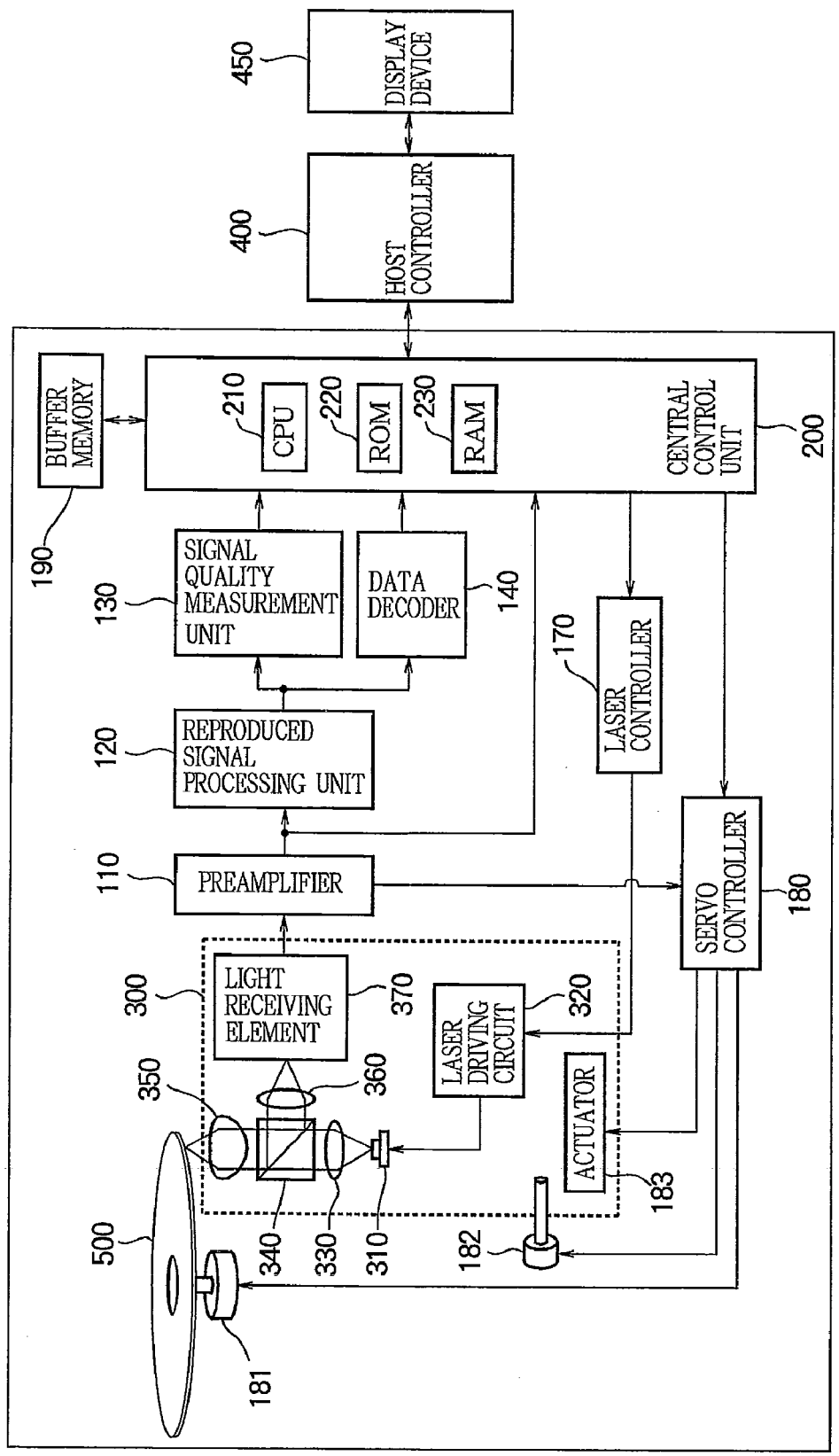
FIG. 1 is a block diagram illustrating an optical disc device according to a first embodiment of the invention.

Embodiments of the invention will now be described with reference to the attached drawings. FIG. 1 is a drawing illustrating an exemplary structure of an optical disc device 100 according to a first embodiment.

The optical disc device 100 shown in the drawing includes an optical head 300, a preamplifier 110, a reproduced signal processing unit 120, a signal quality measurement unit 130, a data decoder 140, a central control unit 200, a buffer memory 190, a servo controller 180, a spindle motor 181, and a sled motor 182.

The servo controller 180 controls the spindle motor 181, which spins the optical disc 500, the sled motor 182, which moves the optical head 300 in the radial direction of the optical disc, and the actuator 183 of the optical head 300.

The reproduced signal from the optical head 300 is amplified in the preamplifying circuit 110 and input to the central control unit 200. The input signal information is decoded in the central control unit 200, and information indicting the present position of the optical head 300 is obtained.

When given the difference between the obtained address information indicating the present position and address information indicating a position to be accessed (target position), the servo controller 180 controls the sled motor 182 to move the optical head 300 to the target position.

In addition, the servo controller 180 uses servo error signals from the preamplifier 110 to drive the actuator 183, thereby performing focus control and tracking control.

In the reproducing of data, laser light with an output value (reproduction power) required for data reproduction is emitted from a semiconductor laser 310 and focused on the optical disc 500 through a collimating lens 330, a beam splitter 340, and an objective lens 350. The reflected light from the optical disc 500 passes through the objective lens 350, is separated from the incident light by the beam splitter 340, and is received by a light receiving element 370 via a detecting lens 360.

Among the elements described above, the semiconductor laser 310, collimating lens 330, beam splitter 340, objective lens 350, and detecting lens 360 constitute an optical system, and the optical system, the light receiving element 370, a laser driving unit 320, and the actuator 183 constitute the optical pickup 300.

The light receiving element 370 converts an optical signal to an electrical signal. The electrical signal as converted in the light receiving element 370 is input to the central control unit 200 and the reproduced signal processing unit 120 via the preamplifier 110.

The reproduced signal processing unit 120 equalizes (reshapes) the electrical signal from the preamplifier 110 and inputs the resultant signal to the signal quality measurement unit 130 and data decoder 140.

The signal quality measurement unit 130 measures signal quality parameters such as the jitter value and error rate of the reproduced signal.

The data decoder 140 binarizes the input reproduced signal and performs decoding, error correction, and other necessary processing, thereby generating (reproducing) the data recorded on the optical disc 500.

The optical disc device 100 is connected to a host controller 400; the central control unit 200 stores the generated data in the buffer memory 190, and then sends the data to the host controller 400. The host controller 400 is connected to, for example, a display device 450.

The central control unit 200 controls the entire apparatus, receiving signal quality information such as jitter information from the signal quality measurement unit 130, receiving reproduced data from the data decoder 140, and giving control signals to the laser controller 170 and the servo controller 180.

The central control unit 200 also performs signal quality measurements, test reproduction and computations for determining the optimum reproduction power PRo, and other processing, such as processing for stopping and resuming data reproduction.

The central control unit 200 includes, for example, a CPU 210, a ROM 220 that stores a program for operating the CPU 210, and a RAM 230 for storing data. The program stored in the ROM 220 includes sections for reproduction control, described later with reference to FIGS. 2 and 11, optimum reproduction power adjustment operations, described later with reference to FIGS. 3 and 12, and definitions of settings required in these operations and in test reproduction.

An EEPROM or other rewritable ROM may be used as the ROM 220, for a reason described below.

The RAM 230 is used for storing various types of data. For example, reproduction power settings are also stored in the RAM 230.

The procedure followed in the reproduction power setting method in this embodiment will now be described with reference to FIG. 2.

First, when an optical disc 500 is inserted into the optical disc device 100, a sensor (not shown) detects the insertion (step S10) and notifies the central control unit 200, which drives the optical head 300 via the servo controller 180 and determines the type (CD, DVD, BD or the like) of the optical disc 500 inserted into the optical disc device 100, how many layers the optical disc 500 has, and other information (step S11).

Next a reproduction power is set in step S12 according to the type determination made in step S11 (this reproduction power is used for the initial adjustment in the next step S13 and for the reading of control information and other information in step S14). A value (initial setting) prestored in the ROM 220 in the central control unit 200, for example, is used as the reproduction power value (control information reading power) set at this time.

Next, in step S13, servo adjustments and other adjustments (initial adjustments), including an adjustment for the tilt angle with respect to the optical disc 500, are made; then in step S14, information specific to the optical disc, control information for controlling reproduction operations, and other information are read from the optical disc 500.

Step S12 has been described as setting the initial reproduction power according to the type of optical disc 500 as determined in step S11, but the initial reproduction power may also be set to a value held in a table defining a relation between the information specific to the optical disc (ID or other information) read in step S14 and the optimum reproduction power PRo that can restrict the degradation of signal quality to a prescribed amount of degradation or less over a previously investigated guaranteed reproduction count RL. However, even if the reproduction power is set in this way, because of lot-to-lot variations of the optical disc 500, lot-to-lot variations of the optical pickup 300 in the optical disc device 100, and other factors, it cannot necessarily be guaranteed that the degradation will be restricted, so that it is advisable to perform the reproduction power adjustment in the next step S15.

In step S15, a reproduction power adjustment (test reproduction and optimum reproduction power calculation) is performed. More specifically, an area in which information is recorded on the optical disc 500 is test-reproduced at a plurality of test reproduction power settings PR(i) (i=1, 2, 3, . . . ), the optimum reproduction power PRo is determined from the relation between the test reproduction power PR(i) and the count ND(i) at which signal quality is degraded by a prescribed amount by the test reproduction, and the optimum reproduction power PRo is set in the laser controller 170. The power settings PR(i) used in this test reproduction are higher than the power PNR used for normal reproduction; an accelerated test is performed by using these higher powers.

After step S15, when a reproduction command is given by a means not shown in the drawings (step S16), in step S17, the reading (playing) of intended data from the optical disc 500 begins with the optimum reproduction power PRo as adjusted and set in step S15.

Among the above steps, the processing in step S10 is performed by the central control unit 200 and the sensor (not shown) that detects the insertion of the optical disc; the processing in step S11 is performed by the optical head 300, preamplifier 110, servo controller 180, and central control unit 200; the processing in step S12 is performed by the central control unit 200; the processing in step S13 is performed by the optical head 300, preamplifier 110, servo controller 180, and central control unit 200; the processing in step S14 is performed by the optical head 300, servo controller 180, preamplifier 110, reproduced signal processing unit 120, data decoder 140, and central control unit 200; the processing in step S15 is performed by the servo controller 180, preamplifier 110, reproduced signal processing unit 120, signal quality measurement unit 130, central control unit 200, laser controller 170, and optical head 300; the processing in step S16 is performed by the central control unit 200 and a means (an interface, not shown) that receives the reproduction command; data reproduction in step S17 and thereafter is performed by the central control unit 200, data decoder 140, laser controller 170, servo controller 180, and optical head 300.

Figure 2:
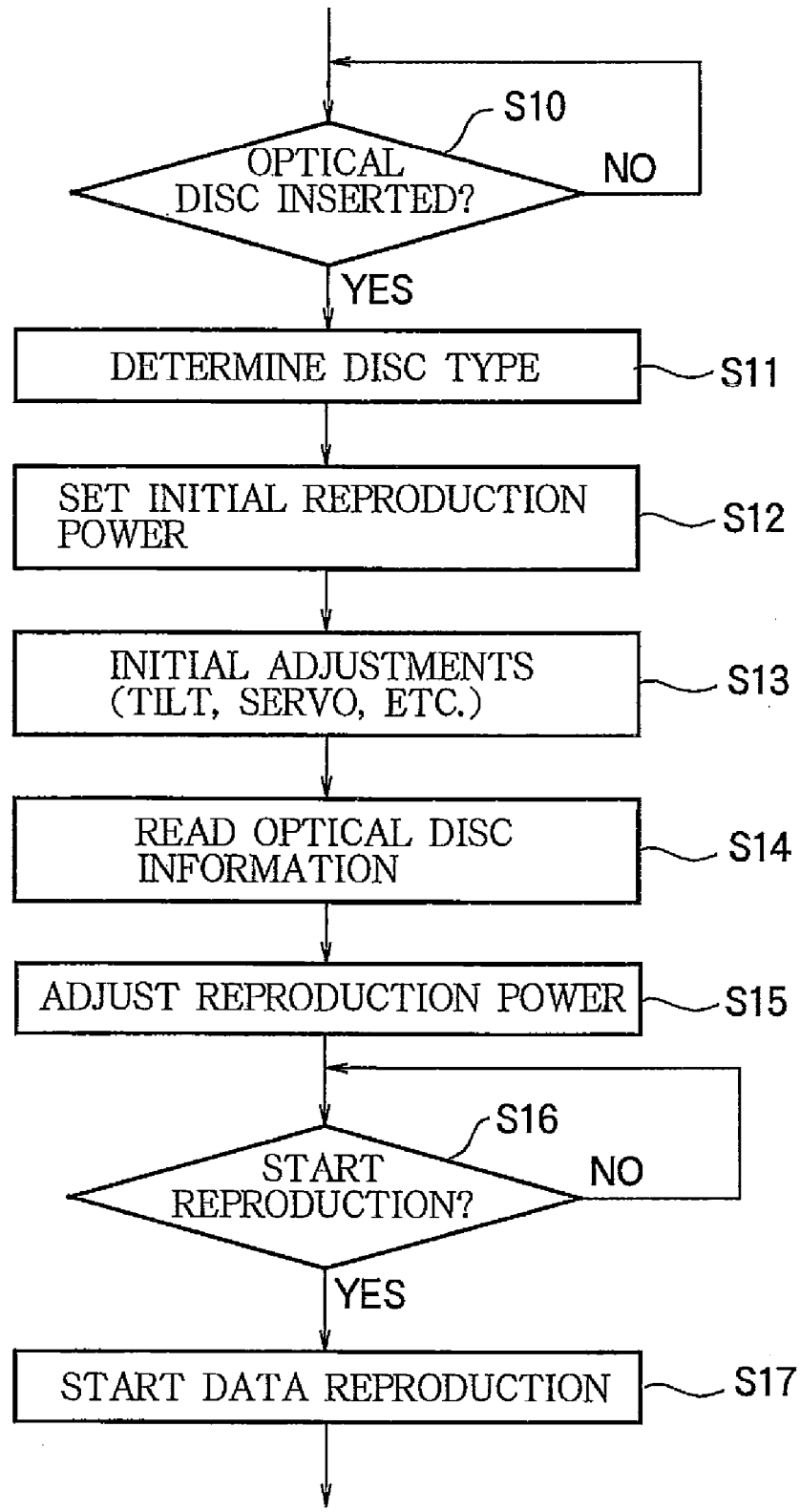
FIG. 2 is a flowchart illustrating an exemplary reproducing procedure used in the optical disc device in the first embodiment.
Figure 3:
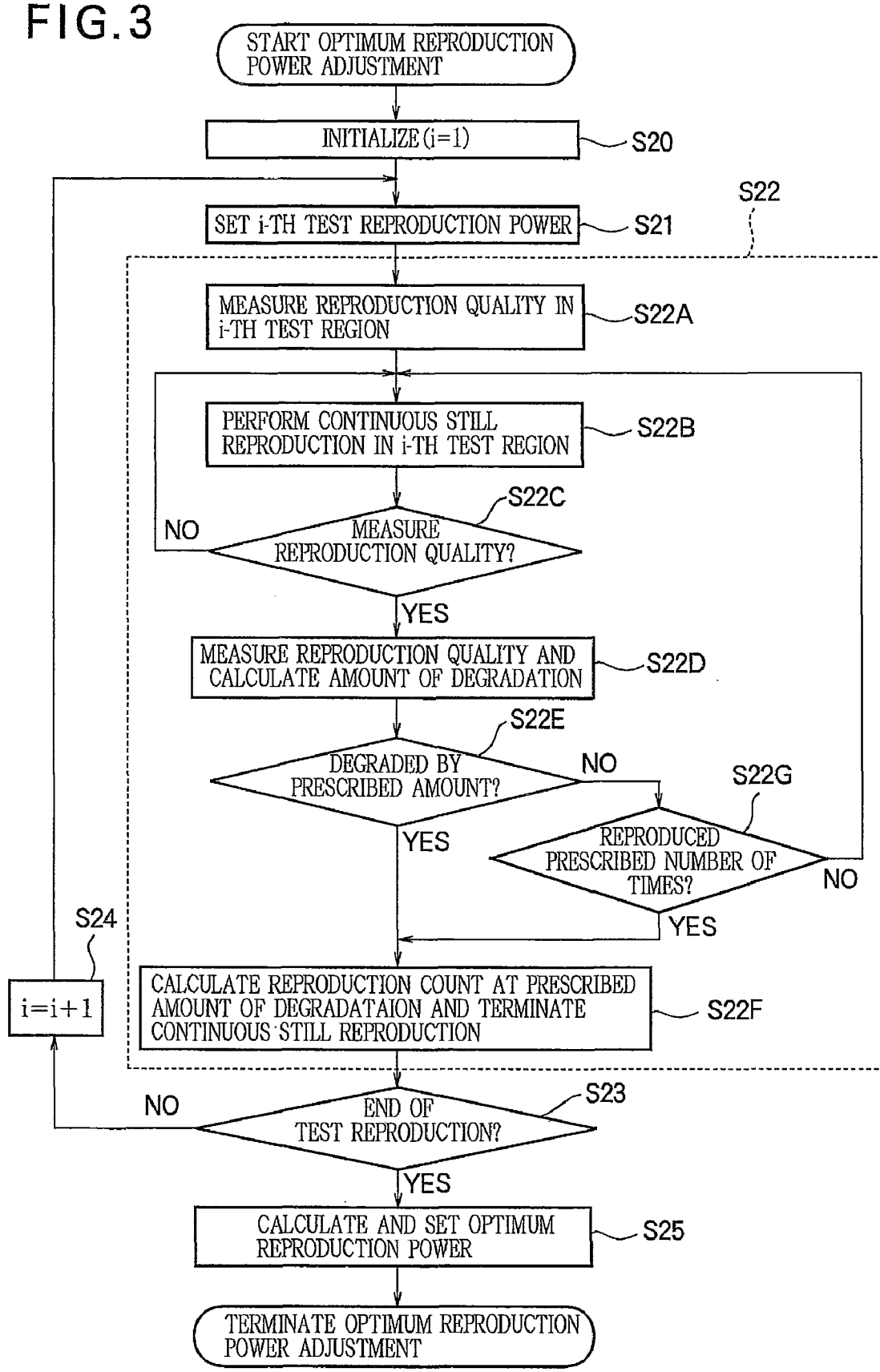
FIG. 3 is a flowchart illustrating an exemplary operating procedure in the reproduction power adjustment step S15 in FIG. 2.

FIG. 3 illustrates the processing in step S15 in FIG. 2 in more detail.

First, in step S20, the number i of test reproductions (a parameter indicating how many times test reproduction was performed) is initialized to one (i=1).

Next, in step S21, the i-th test reproduction power PR(i) is set. Here the reproduction power is set to a value corresponding to the number of test reproductions (the value of i), which is prestored in a list of reproduction power values in, for example, the ROM 220 in the central control unit 200. The list of reproduction power values may be organized so that the smallest value within a prescribed range is selected first and then successively larger values are selected, or conversely, so that the largest value in the prescribed range is selected first and then successively smaller values are selected.

Next, in step S22, test reproduction is performed with the test reproduction power set in step S21.

First, in step S22A, in the i-th test area, the initial reproduction quality (reproduced signal quality before starting continuous still reproduction) is measured. Then, in step S22B, continuous still reproduction is performed in the area (i-th test area) in which the reproduction quality was measured in step S22A.

In the selection of the test areas used for test reproduction, it is desirable to give preference to areas that are reproduced infrequently. It is best to avoid areas that are reproduced frequently, such as, for example, areas in which disc control information is managed, areas in which content menu information is stored, and areas from which thumbnail images and moving pictures are reproduced when a menu is presented.

The test areas used for test reproduction may be managed by saving the relevant information together with the information specific to the optical disc 500 (in association with the specific information) in the ROM 220 (if EEPROM) in the central control unit 200, or in an information storage means (e.g., external memory or built-in HDD, not shown) in the host controller 400.

However, the test areas used for test reproduction need not necessarily be managed in this way; for example, if an area separated by an area large enough for at least one test reproduction from the areas in which test reproduction was previously performed is available, reproduced signal quality may be measured in a plurality of areas including the areas preceding and following the area in which test reproduction will be performed, and areas in which the reproduced signal quality is not degraded may be treated as unused areas for test reproduction. In this case, however, it is also necessary to select an area that is not directly adjacent (either inwardly or outwardly) to any area that has been degraded by test reproduction.

In step S22C, the number of times that information in the selected area is reproduced in continuous still reproduction is monitored and whether or not to measure the reproduction quality is decided. If the decision in step S22C is not to measure the reproduction quality (if No), the process returns to step S22B, and still reproduction continues. If the decision in step S22C is to measure the reproduction quality (if Yes), then in step S22D, the reproduction quality in the test area in which information has been continuously reproduced is measured, and the amount of degradation QD(i, j) in relation to the initial reproduction quality measured in step S22A is calculated.

The decision whether to measure the reproduction quality or not in step S22C is based on whether or not the reproduction count NS(i)=NT(i, 1) from the start of continuous still reproduction in step S22B or the reproduction count NT(i, j) after a measurement of the reproduction quality in step S22D has reached a prescribed value NTL(i, j) (where j is a parameter indicating how many times reproduction quality was measured in test reproduction with reproduction power PR(i)).

Next, in step S22E, whether or not the amount of degradation QD(i, j) is greater than a specified prescribed value QDM is decided. If the amount of degradation QD(i, j) determined in step S22D is greater than the specified prescribed value QDM (if Yes), the process proceeds to step S22F.

If the amount of degradation QD(i, j) determined in step S22D is less than the prescribed value QDM (if No in S22E), then in step S22G, the continuous still reproduction count NS(i) with the reproduction power used in the test reproduction is compared with a preset upper limit NSL limiting the number of test reproductions. If the test reproduction count is less than the preset upper limit (prescribed number) NSL (if No in S22G), the process returns to step S22B, in which the information in the test reproducing area is still-reproduced again, and step S22C and the subsequent processing are repeated.

If the reproduction count is equal to or greater than the preset upper limit number (prescribed number) NSL of test reproductions (if Yes in S22G), the process proceeds to step S22F.

In step S22F, the number of reproductions ND(i) until the amount of degradation QD(i,j) reaches the prescribed value QDM (the degradation count, in other words, the life-span reproduction count) is calculated, the calculated reproduction count ND(i) is stored together with the corresponding reproduction power (i-th test reproduction power) PR(i) (in association with the reproduction power PR(i)) in the RAM 230 in the central control unit 200, for example, and continuous still reproduction is terminated. After step S22F, the process proceeds to step S23.

Since the reproduction count corresponds to the amount of reproducing time, it can also be said that the reproduction count (degradation count) ND(i) until the amount of degradation reaches the prescribed value corresponds to the amount of reproducing time over which the amount of degradation reaches the prescribed value. Both the 'reproduction count (degradation count, in other words, the life-span reproduction count) ND(i) at which the amount of degradation reaches the prescribed value' and the 'reproduction time (degradation time, in other words, the life-span reproduction time) at which the amount of degradation reaches the prescribed value' are used as a life-span index.

The calculation of the degradation count in the above step S22F is carried out in the following way. When the process proceeds to step S22F from a Yes decision in step S22E, since the current amount of reproduction quality degradation QD(i, j) with the (i-th) reproduction power has been determined (where i is a specific value and j is the measurement count), the relation between the amount of degradation and the logarithm of the reproduction count is approximated by curve-fitting (using spline curves or the like, for example), and from the result, the reproduction count at which the QD value given by the approximation comes nearest to the preset reference amount of degradation QDM is determined. If the approximation is made with spline curves, a plurality of points neighboring the reference amount of degradation QDM may be used (or all points may be used).

The calculation can also be carried out by finding two points at which the approximation results or pre-approximation results QD(i, j) straddle the reference amount of degradation QDM and calculating ND(i) by linear approximation.

When the process proceeds to step S22F from a Yes decision in step S22G, the relation between the amount of degradation QD at the last reproduction quality measurement and the amount of degradation QD at a plurality of previous reproduction quality measurements and the logarithm of the corresponding reproduction counts is linearly approximated, and the reproduction count at which the QD value reaches the reference amount of degradation QDM is calculated by extrapolation from the result of the approximation. When there is a large difference between the reference amount of degradation QDM and the last measured amount of degradation QD (when the QD value is half the QDM value or less, for example), no calculation is carried out because extrapolation may cause a significant error (alternatively, this decision may be based on the amount of approximation error). In this case, when the QD value would not reach the reference amount of degradation QDM at the prescribed reproduction count if the reproduction power were to be further reduced, a reproduction power one step larger than the greatest reproduction power measured so far is set, in the setting of the reproduction power in step S21, and subsequent test reproductions are carried out at increasing levels of reproduction power.

The interval at which the reproduction quality is measured in step S22D (the reproduction count NTL(i, j) from the j-th (j=1, 2, 3, . . . ) reproduction quality measurement to the next reproduction quality measurement) may be a preset fixed interval (a fixed reproduction count), or may be changed according to the amount of degradation of the reproduction quality calculated in step S22D. For example, the interval may be shortened as the amount of degradation calculated in step S22D approaches the prescribed amount of degradation designated in step S22E.

Depending on the reproduction power used in test reproduction, the reproduced signal quality may degrade suddenly, so that especially in the first test reproduction (when i=1) or when test reproduction is carried out by using a reproduction power greater than the reproduction power used in the test reproductions carried out previously, it is preferable to shorten the interval NTL(i, j) at which the reproduction quality is measured after the start of continuous still reproduction, to thereby prevent the reproduction quality from being unnecessarily degraded.

In the decision in step S22E, if the difference between the amount of degradation QD(i,j) in reproduction quality and the preset reference amount of reproduction quality degradation QDM is small (for example, if the degradation difference QDM−QD(i, j) is equivalent to 10% or less of the predetermined amount of reproduction quality degradation QDM (i.e., QD(i, j) is equivalent to 90% of QDM or more) and accordingly it can be determined that the desired value of degradation would be reached with further reproduction), the decision as to whether or not reproduction has been performed the prescribed number of times NSL in step S22G may be skipped and the process may proceed from step S22E to the next step S22F.

Next, in step S23, whether to terminate test reproduction or not is decided. If it is decided not to terminate test reproduction (if No) in step S23, the value i that controls the test count is incremented by one in step S24 and step S21 and the subsequent processing are executed again. As the value of i is incremented, the reproduction power PR(i) is also changed. For example, starting from the reproduction power PR(i) in the first test reproduction (i=1), the reproduction power may be changed to successively lower values or to successively higher values.

If it is decided to terminate test reproduction (if Yes) in step S23, then in step S25 the optimum value of the reproduction power, that is, the reproduction power setting to be used in actual playing, is calculated by computation from the relation between the reproduction powers PR(i) (i=1, 2, . . . ) used in the test reproductions that were performed and the reproduction counts (degradation counts) ND(i) at which the reproduction quality had degraded by the prescribed amount.

For example, from the relation between the reproduction powers PR(i) (i=1, 2, . . . ) and the degradation counts ND(i), the reproduction power PRm at which the degradation count ND reaches the guaranteed reproduction count RL (the maximum reproduction power) is determined; the optimum reproduction power Pro is determined from the maximum reproduction power PRm; and the optimum reproduction power PRo is made the reproduction power setting (target value) to be used in actual playing.

The calculation of the optimum reproduction power in step S25 and the decision whether or not to terminate the test reproduction in step S23 will be described later.

Figure 4:
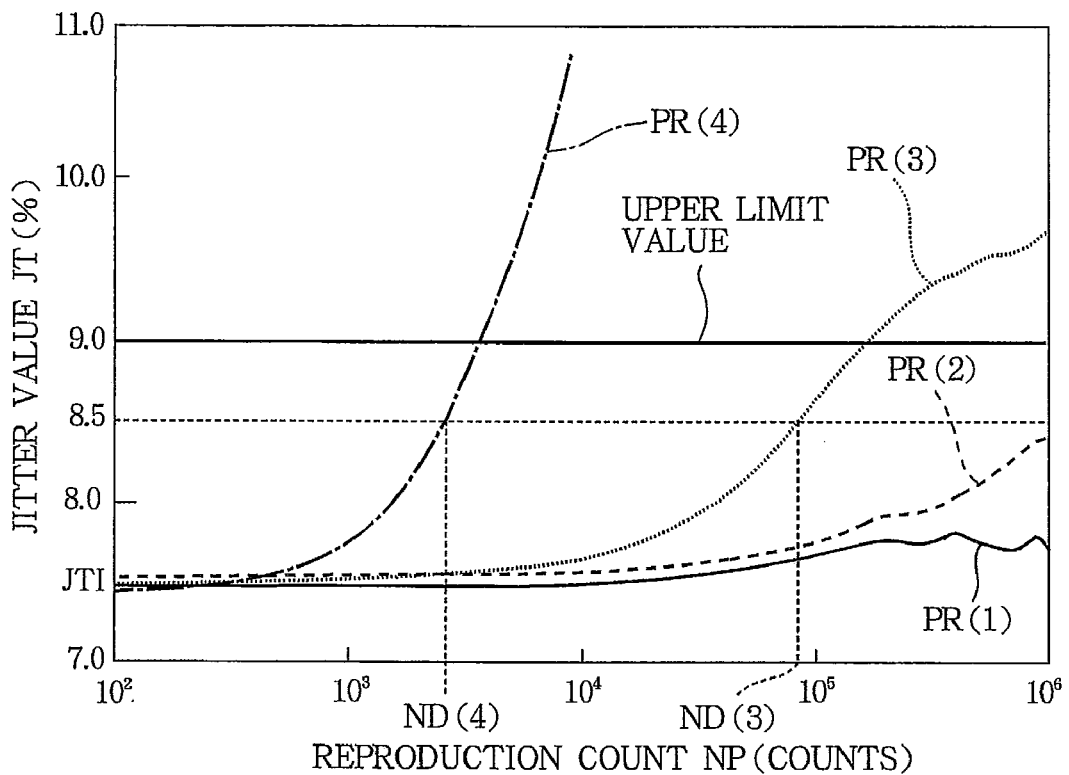
FIG. 4 is a graph illustrating the relation between number of reproductions and jitter in repetitive reproduction from the optical disc.

Next, the relation among reproduced signal quality, reproducing time, and reproduction power will be described with reference to FIG. 4. FIG. 4 shows the relation between the reproduction count NP(i) (i=1, 2, 3, 4) and reproduced signal quality (jitter value) JT for differing reproduction powers PR(1), PR(2), PR(3), PR(4). The relation among these reproduction power values is PR(1)<PR(2)<PR(3)<PR(4).

A larger jitter value JT means lower reproduced signal quality; the upper limit IT of the jitter value JL indicates the level at which a problem is likely to arise in reproduction performance. The increase in the jitter value JT with respect to the initial value JTI is the amount of reproduced signal quality degradation QD.

As shown in FIG. 4, as the reproduction power increases, the signal quality degrades and the jitter value JT exceeds the upper limit value JL at a lower reproduction count NP.

Figure 5:
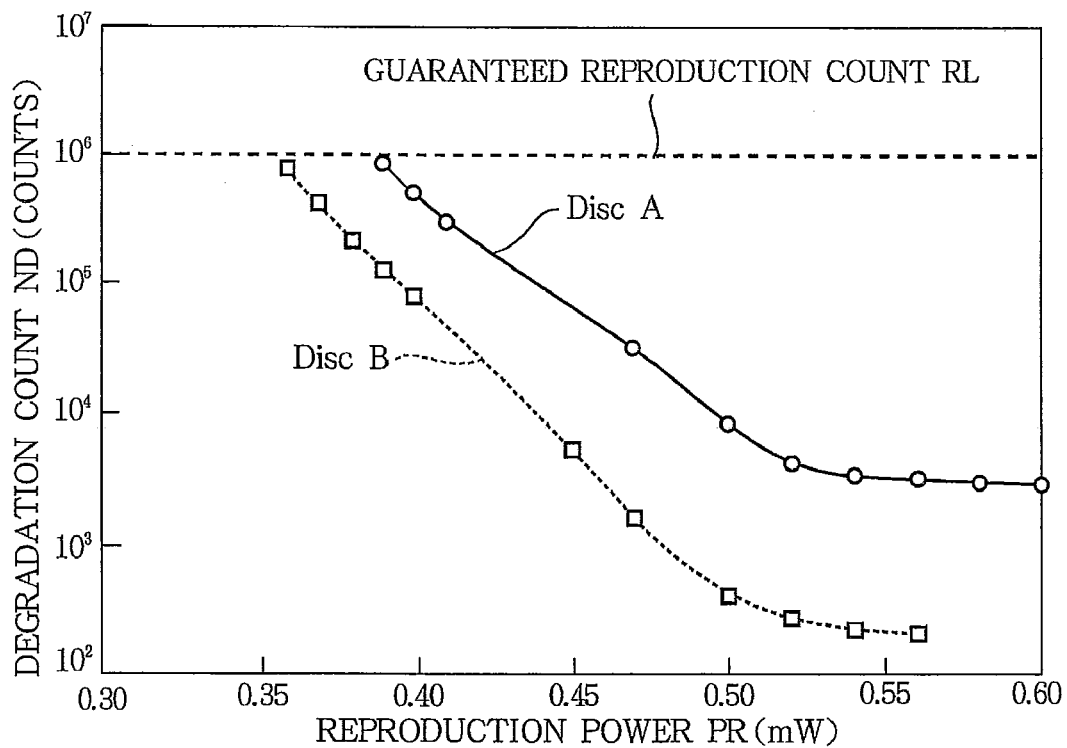
FIG. 5 is a graph illustrating the relation between reproduction power and degradation count ND (life-span reproduction count: the number of reproductions until reproduced signal quality is degraded by a prescribed amount), obtained by repetitive reproduction from the optical disc.

Next, the relation between the reproduction power and degradation count (the reproduction count (life-span reproduction count) at which the reproduced signal quality level degrades by the prescribed amount) ND will be described with reference to FIG. 5. This graph shows relations between reproduction power and degradation count ND for two different BD-RE discs. The amount of reproduced signal quality degradation QDM used to determine the degradation count ND is defined as a 1% degradation in jitter value with respect to the jitter value JTI at the start of reproduction. That is, if the jitter value JTI at the start of reproduction is 7.5% as shown in FIG. 4, the reproduction count NP at which the jitter value reaches 8.5% is defined as degradation counts ND(3) and ND(4). In FIG. 5, the round marks indicate the results of tests carried out with different reproduction powers (at different positions) on a BD-RE disc (Disc A); the square marks indicate the results of tests carried out with different reproduction powers (at different positions) on another BD-RE disc (Disc B).

The guaranteed reproduction count RL is a reproduction count guaranteed by the optical disc device 100 as the number of reproductions ND before the jitter value degrades by 1%; here ND is one million. The degradation count ND is plotted on a logarithmic scale.

On both discs, in the low reproduction power region (the region below a value in the neighborhood of 0.5 mW to 0.52 mW), the relation between the reproduction power and degradation count ND is one of exponential change, and can be approximated by a substantially straight line in FIG. 5. In contrast, in the high reproduction power region (the region above a value in the neighborhood of 0.5 mW to 0.52 mW) it can be seen that the degradation count ND changes with reproduction power much more slowly than in the low reproduction power region.

Figures 6A, 6B, 6C:
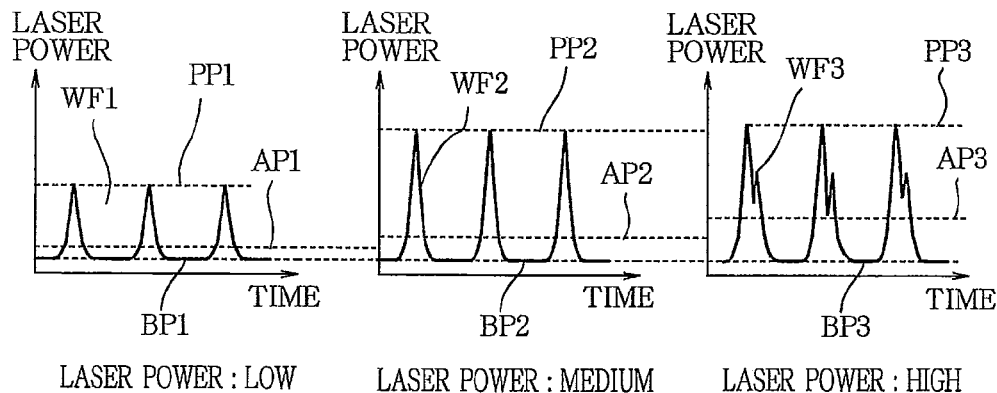
FIGS. 6(a) to 6(c) are graphs illustrating relations between reproduction power and output waveforms of the laser that irradiates the optical disc during reproduction.

A possible cause of this difference in the relation between the degradation count and reproduction power in the low reproduction power region and high reproduction power region is the influence of the reproduction waveform emitted by the laser during reproduction. FIGS. 6(a) to 6(c) show relations between laser reproduction power and reproduction waveforms (WF1, WF2, WF3). In general, in reproduction, as shown in FIGS. 6(a) to 6(c), intermittent high-frequency emission is performed with superimposed high-frequency waves. This is done to improve the CN ratio of the reproduced signal by using multimode laser oscillation to achieve a relative reduction in noise. In this case, the reproduction power when the optical disc 500 is irradiated is equivalent to the average power (AP1, AP2, AP3) in FIGS. 6(a) to 6(c). When the reproduction power increases, as shown in the difference in the laser output waveforms (WF1, WF2) in FIGS. 6(a) and 6(b), there is no change in the waveform but the peak power increases (from PP1 to PP2), resulting in an increase in average power. If the laser power increases too much, however, the laser becomes unable to respond adequately to the superimposed high frequencies, causing a deformation of the laser output waveform (WF3) as shown in FIG. 6(c). Even though the average power increases, the peak power (PP3) hardly increases at all, because of the effect of the deformation of the laser output waveform. In FIGS. 6(a) to 6(c), the bottom powers BP1, BP2, BP3 are all equal.

The degree of degradation due to repetitive reproduction of a signal recorded on the optical disc 500 is affected by the magnitude of the peak power rather than the average power, so that the relation between the degradation count and reproduction power becomes more gradual in the high reproduction power region.

Next, the use of the Arrhenius plot, generally used in life-span prediction, to predict the reproduction power at which the degradation count ND reaches the guaranteed reproduction count RL will be described. In general, the Arrhenius equation for predicting the chemical reaction rate of a given material at a given temperature is expressed as equation (1) by use of a rate coefficient k, a constant (frequency factor) A unrelated to temperature, the activation energy E, the gas constant R, and the temperature T.

$$k = A^* \exp(-E/RT) \quad (1)$$

The life span L is the reciprocal (1/k) of the rate coefficient k, so that equation (1) can be converted to equation (1a).

$$L = 1/k = A' \times \exp(E/RT) \quad (1a)$$

The A' in equation (1a) is the reciprocal of A in equation (1).

Taking the natural logarithm on both sides of equation (1a) gives the expression in equation (2).

$$\ln(L) = (E/R)^*(1/T) + \ln(A) \quad (2)$$

The Arrhenius plot is a plot of data with the natural logarithm of life span L on the vertical axis and the reciprocal (1/T) of temperature T on the horizontal axis; life span is predicted from the result of a linear approximation.

The reciprocal (1/T) of temperature T in equation (1a) is equivalent to stress in an accelerated test. Therefore, if instead of temperature the reproduction power is given as the stress (replacing the reciprocal 1/T of the temperature with the reproduction power PR), the life span L is set equal to the degradation count ND, and the ratio (E/R) of activation energy E to the gas constant R is set equal to a constant β, equation (1a) can be expressed as follows.

$$ND = A' \times \exp(-\beta \times PR) \quad (2a)$$

Since the reciprocal (1/T) of temperature T is being replaced by the reproduction power PR as stress here, the sign of the constant β is reversed. This is because the life span L lengthens as the reciprocal (1/T) of temperature T increases, whereas the degradation count ND corresponding to the life span L shortens as the reproduction power increases.

Taking the natural logarithm on both sides of equation (2a) gives the expression in equation (2b).

$$\ln(ND) = -\beta \times PR + \ln(A') \quad (2b)$$

Since -β corresponds to a slope (gradient) Ka and ln(A') corresponds to an intercept Kb, and the following equation (3) is obtained.

$$\ln(ND) = Ka \times PR + Kb \quad (3)$$

If the Arrhenius plot displays the reproduction power on the horizontal axis and the natural logarithm of the degradation count ND on the vertical axis, the higher the reproduction power becomes, the smaller the natural logarithm of the degradation count ND becomes, so that the graph slopes downward to the right and the reproduction power at which the degradation count ND reaches the guaranteed reproduction count RL can be predicted by finding the reproduction power PR (the maximum reproduction power PRm) at the point where ND equals RL in equation (3).

In this embodiment, the reciprocal (1/T) of temperature T is replaced with reproduction power PR as stress, but temperature T may be replaced with reproduction power PR. In that case, equation (2a) becomes the following.

$$ND = A \times \exp(\beta/PR) \quad (2c)$$

If the Arrhenius plot displays the reciprocal (1/PR) of the reproduction power PR on the horizontal axis and the natural logarithm of the degradation count ND on the vertical axis, the greater the reciprocal (1/PR) of the reproduction power PR becomes, the greater the natural logarithm of the degradation count ND becomes, and the graph slopes upward to the right.

Figure 7:
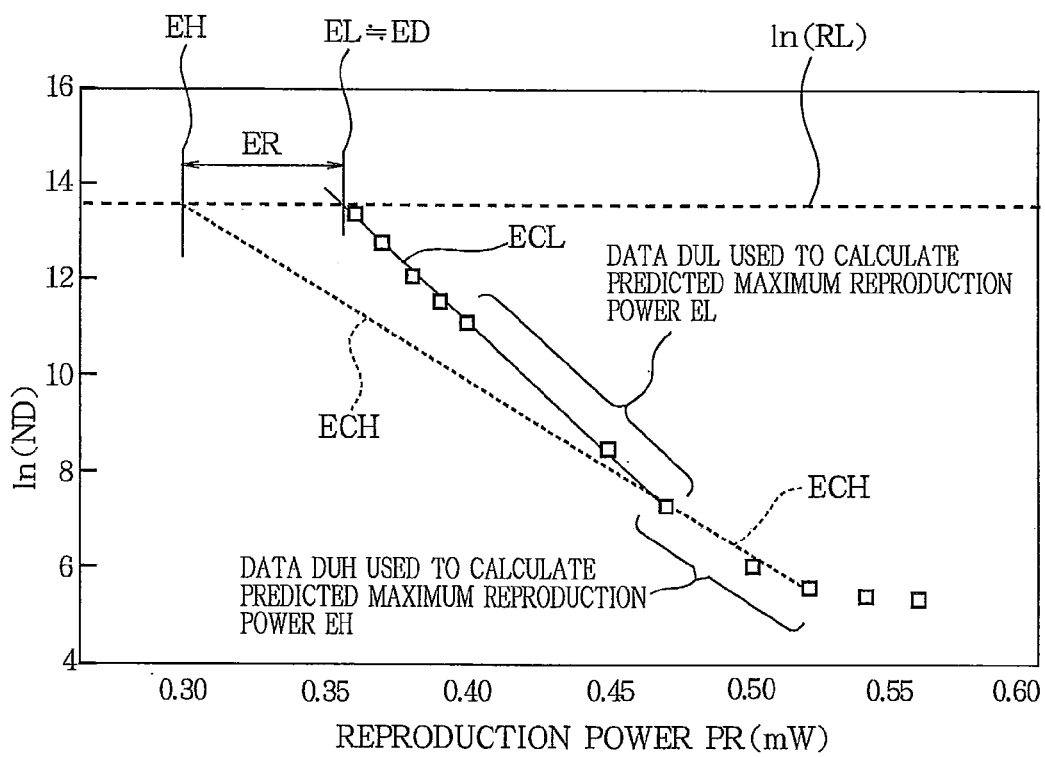
FIG. 7 is a graph using an Arrhenius plot to predict the reproduction power at which the degradation count (life-span reproduction count) becomes equal to a guaranteed reproduction count.

FIG. 7 shows a graph using an Arrhenius plot. In FIG. 7, the plot is for Disc B in FIG. 5; the square marks indicate measured values, the solid straight line ECL is an approximation line plotted by using data DUL obtained as a result of reproduction with low reproduction power, and the dotted straight line ECH is an approximation line plotted by using data DUH obtained as a result of reproduction with high reproduction power.

When the solid straight line ECL approximating the data UDL obtained as a result of reproduction with low reproduction power is extended to obtain the reproduction power EL at which the degradation count ND is predicted to reach the guaranteed reproduction count RL, it is found to be equivalent to the measured value ED (EL≈ED). In contrast, when the straight line ECH approximating the data DUH obtained as a result of reproduction with high reproduction power is extended to obtain the reproduction power EH at which the degradation count ND is predicted to reach the guaranteed reproduction count RL, it is found to differ greatly from the measured value ED, producing significant prediction error ER.

Thus when an Arrhenius plot is used, the inclusion of high reproduction power is found to prevent accurate prediction of the maximum reproduction power (the reproduction power at which the degradation count ND reaches the guaranteed reproduction count RL). While an Arrhenius plot in the region with only low reproduction power enables accurate prediction of the maximum reproduction power, test reproduction at a low reproduction power requires a longer time to cause degradation, lengthening the time required to obtain a prediction of the optimum reproduction power.

In order to solve this problem, this embodiment enables the prediction of reproduction power by shortened test reproduction in which an approximation is made that includes the high reproduction power region. Equation (4) represents an equation for the approximation curve APC used for this purpose.

$$\ln(ND) = f\{(AA-DD)/(1+\exp(BB \times PR - CC)) + DD\} + EE \quad (4)$$

Figure 8:
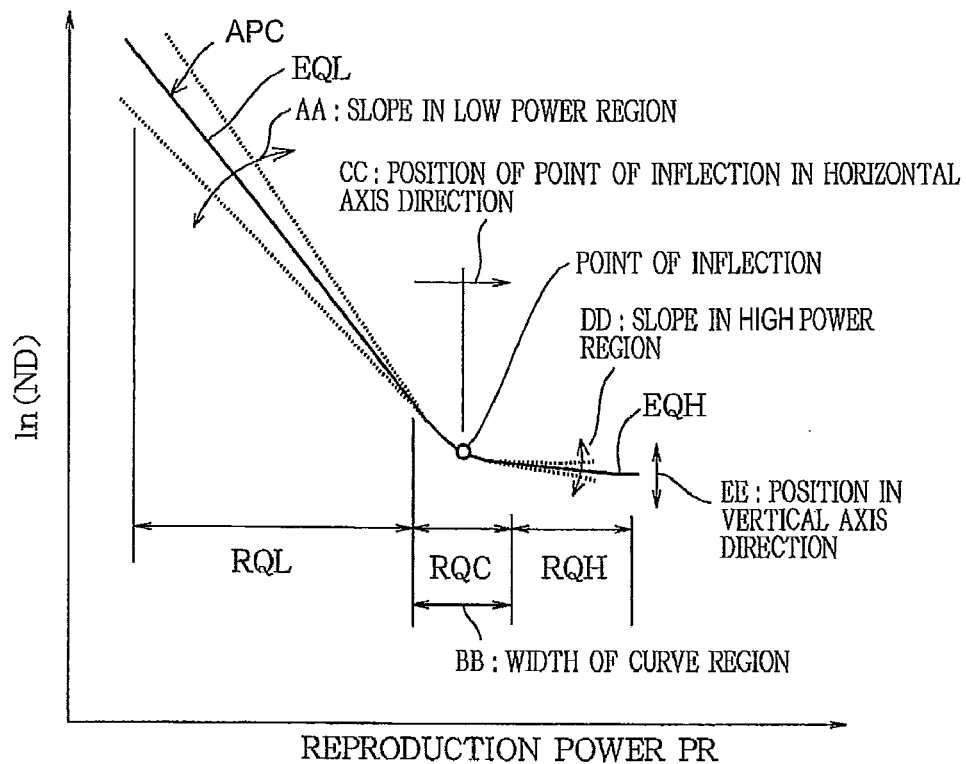
FIG. 8 is a graph showing an approximation curve used for predicting the reproduction power (maximum reproduction power) PRm at which the degradation count (life-span reproduction count) becomes equal to the guaranteed reproduction count.

FIG. 8 shows the relation between the parameters in equation (4) and the approximation curve APC. In FIG. 8, as in an Arrhenius plot, the horizontal axis indicates reproduction power PR and the vertical axis indicates the natural logarithm of the degradation count ND. Although the natural logarithm of the degradation count ND is taken on the vertical axis, the common logarithm may be used instead. Equation (4) includes five parameters, AA, BB, CC, DD, and EE.

The approximation curve APC expressed by equation (4) is the integral function of a curve called a sigmoid function (equation (5)). The sigmoid function is a curve often used to represent growth, death rates, demand, or the like; it is an S-shaped curve asymptotically approaching fixed values at positive or negative infinity.

$$f(x) = 1/(1+\exp(-x)) \quad (5)$$

As an integral curve of a sigmoid curve, the ln (ND) in equation (4) used in this embodiment asymptotically approaches a straight line with a fixed slope at positive or negative infinity.

Accordingly, the approximation curve APC expressed by equation (4) can be broadly divided into three regions: a low power region RQL, a curve region RQC, and a high power region RQH. This approximation curve APC takes the form of straight lines with mutually different slopes in the low power region RQL and high power region RQH, and bends in the curve region RQC to join the straight line section in the low power region RQL (the first straight line section) and the straight line section in the high power region RQH (the second straight line section). The second straight line section has a more gradual slope than the first straight line section.

The parameters have the following effects on the approximation curve APC expressed by equation (4).

AA is a parameter that determines the slope of the asymptotic straight line EQL in the low power region RQL.

DD is a parameter that determines the slope of the asymptotic straight line EQH in the high power region RQH.

BB is a parameter that determines the width of the curve region RQC; the smaller its value is, the narrower the curve region becomes.

CC is a parameter that determines the position (in the horizontal axial direction) of a point of inflection corresponding to the center of the curve region.

EE is a parameter that determines the position in the vertical axial direction of the asymptotic straight line EQH in the high power region RQH.

In defining the shape of the approximation curve APC these five parameters are not fully independent of each other; each has effects on other regions. For example, AA and DD affect not only the slopes of the straight lines in the low power region RQL and high power region RQH but also the width of the curve region RQC defined by BB, and vice versa.

The relation between the reproduction power PR and the natural logarithm of the degradation count ND can be determined by optimal adjustment of the above five parameters, that is, by defining the approximation curve APC so as to minimize the overall error between the values on the approximation curve APC obtained by setting the five parameters and the measured values obtained by test reproduction (the degradation count ND for each reproduction power PR) by, for example, minimizing the sum of the squared error.

In addition, from the resulting approximation curve APC and the guaranteed reproduction count RL, the reproduction power (maximum reproduction power) at which the degradation count ND reaches the guaranteed reproduction count RL can be obtained.

Figure 9:
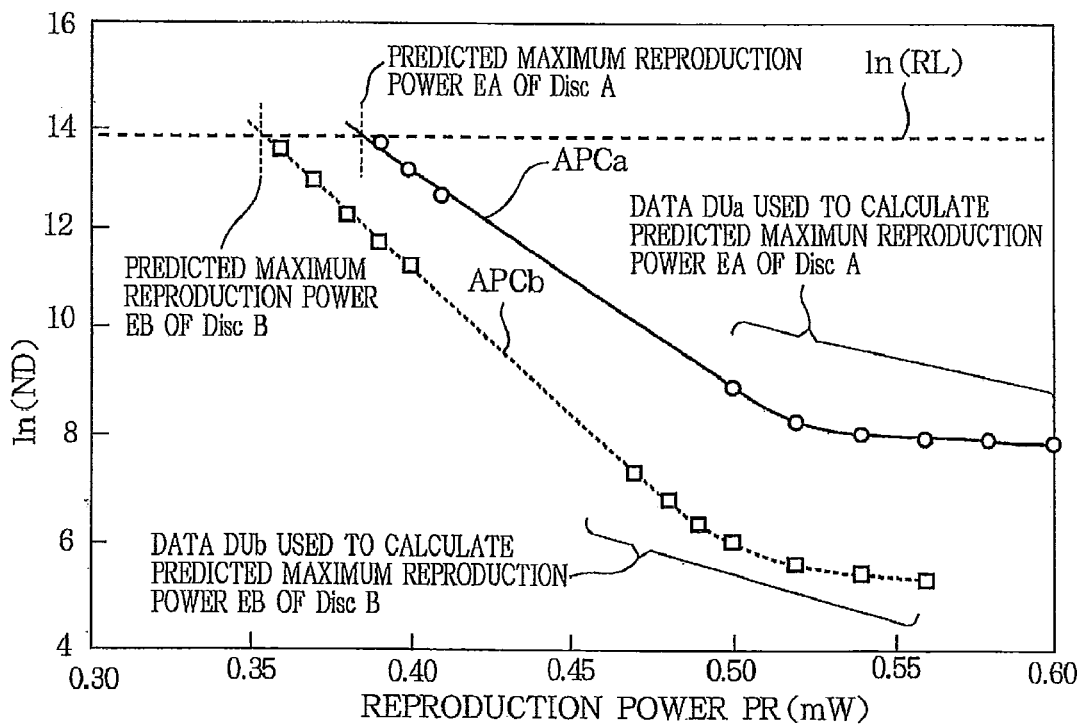
FIG. 9 is a graph showing approximation curves used for predicting the reproduction power (maximum reproduction power) PRm at which the degradation count (life-span reproduction count) becomes equal to the guaranteed reproduction count, and measured values.

FIG. 9 shows the approximation curves APCa, APCb when the relations (based on measured values) between reproduction power and degradation count on the two different types of BD-RE discs are approximated by equation (4). In this graph, the round marks and solid line APCa are for Disc A, the square marks and dotted line APCb are for Disc B, and the measured values used for the approximations, indicated by the symbols DUa, DUb, are limited to values obtained by measurement with relatively high reproduction power, mainly belonging to the curve region and the high power region.

The predicted reproduction power values EA, EB at which the two approximation curves APCa, APCb intersect the guaranteed reproduction count RL in FIG. 9 are seen to be substantially identical to the measured values, indicating that even if the data in the high power region that caused erroneous reproduction power predictions in Arrhenius plotting are used, the maximum reproduction power (the reproduction power at which the degradation count ND becomes equal to the guaranteed reproduction count RL) can be predicted with high accuracy.

In step S15 in FIG. 2, as described above, using the reproduction power at which the degradation count ND reaches the guaranteed reproduction count RL as the maximum reproduction power (the upper tolerance limit of the reproduction power), a power value identical to this value or a value slightly smaller than this value (allowing a margin) is set as the optimum reproduction power PRo. That is, a reproduction power at which the degradation of the reproduced signal at the guaranteed reproduction count RL can be restricted to a prescribed value or less is set as the optimum reproduction power PRo.

Next, the decision whether or not to terminate the test reproduction in step S23 in FIG. 3 will be described with reference to FIGS. 10(a) to 10(c). FIG. 10(a) shows the degradation characteristic result obtained from the relation between reproduction power PR and the natural logarithm of the degradation count ND; FIG. 10(b) indicates the differentiation result (first derivative) D1 obtained by differentiating the degradation characteristic result in FIG. 10(a) once; FIG. 10(c) indicates the differentiation result (second derivative) D2 obtained by differentiating the degradation characteristic result in FIG. 10(a) twice.

The differentiation result D1 in FIG. 10(b) is the result of one differentiation (first-order differentiation) of the degradation characteristic result and differentiation result D2 is the result of a further differentiation of differentiation result D1. By differentiating the degradation characteristic result, a curve with a peak at the position of the point of inflection (the point of inflection of the first derivative) in the degradation characteristic result is obtained. Taking advantage of this fact, test reproduction is terminated when the peak (maximum) point and at least one data point on each side thereof have been obtained from the measured data as differentiation result D2.

Figure 10:
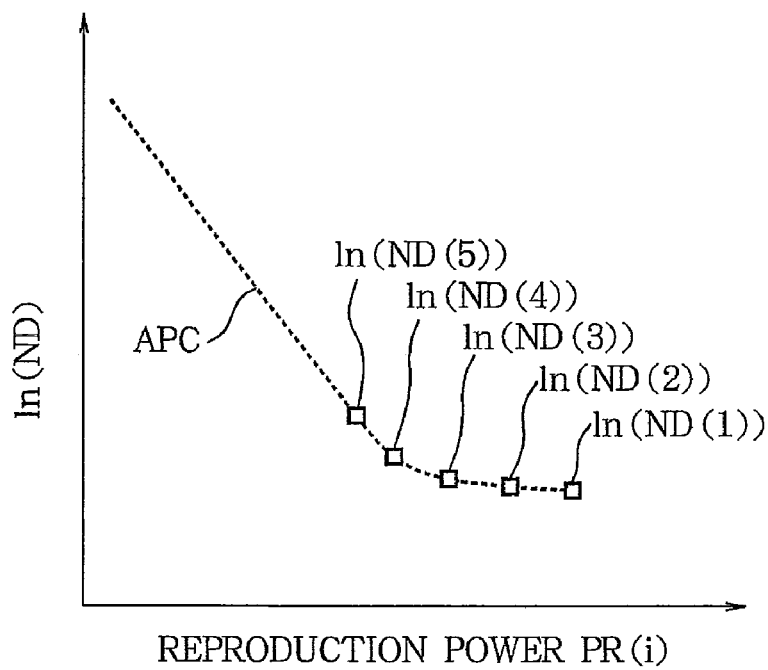
FIGS. 10(a) to 10(c) are graphs showing data used to determine the end of test reproduction in the first embodiment.
Figure 10:
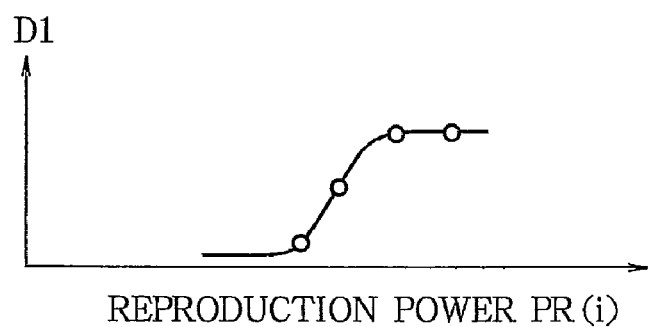
Figure 10:
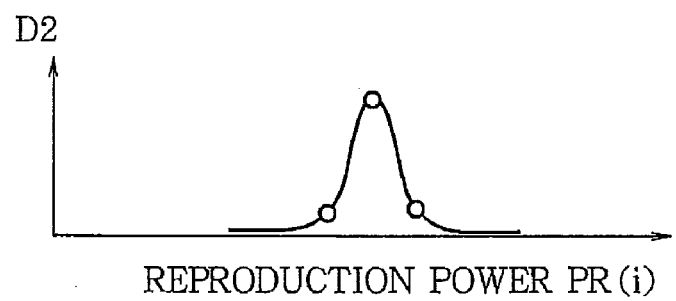

More specifically, as the parameter i is incremented in step S24, the test reproduction power PR is gradually reduced from PR(1) to PR(2), then to PR(3), PR(4), and PR(5) as shown in FIG. 10(a), for example, (S21), the reproduction counts leading to the prescribed amount of degradation are calculated (S22F) from the degradation data obtained for these reproduction powers, data are obtained sequentially by twice differentiating the natural logarithms of the reproduction counts ND(1), ND(2), ND(3), ND(4), ND(5) leading to the prescribed amount of degradation obtained for the different reproduction powers (PR(1) to PR(5) in FIG. 10 (a)), a decision is made as to whether the peak point and points positioned on both sides thereof are obtained or not, and when these points have been obtained, the test reproduction is terminated.

The examples shown in FIGS. 10(a) to 10(c) are represented by the natural logarithms ln(ND(i)) of the reproduction count leading to the prescribed amount of degradation for each reproduction power PR(i).

The first differentiation result D1(i) is calculated as $$D1(i)=\ln(ND(i))-\ln(ND(i-1)).$$

The second differentiation result D2(i) is calculated as $$|D2(i)|=|D1(i)-D1(i-1)|.$$

Then from the data obtained so far, the approximation curve APC is obtained. That is, the degradation characteristic is estimated.

Instead of determining the reproduction count leading to the prescribed amount of degradation by gradually reducing the test reproduction power as described above, the test reproduction power may be gradually increased, the reproduction count leading to the prescribed amount of degradation may be determined for each reproduction power, and the twice differentiated data of the natural logarithm of the reproduction count leading to the prescribed amount of degradation obtained with each different reproduction power may be sequentially obtained, on the basis of which decisions may be made as to whether the peak point and points positioned on both sides thereof have been obtained or not, as described above.

Even if the data obtained by differentiating twice take values of substantially zero and lack peaks, when a large difference (a difference equal to or greater than a prescribed value) has occurred in the first differentiation result D1, it may be concluded that a plurality of measurements have been carried out in both the high power region and low power region and test reproduction may be terminated.

More specifically, as the parameter i is incremented in step S24, the test reproduction power is gradually reduced, from PR(1) to PR(2), then to PR(3), PR(4), and PR(5) as shown in FIG. 10(a), for example, (S21), the reproduction counts leading to the prescribed amount of degradation are calculated (S22F) from the degradation data obtained for these reproduction powers, data are obtained sequentially by twice differentiating the natural logarithms of the reproduction counts ND(1), ND(2), ND(3), ND(4), ND(5) leading to the prescribed amount of degradation obtained for the different reproduction powers (PR(1) to PR(5) in FIG. 10), and even if the data take substantially zero values and lack a peak, test reproduction may be terminated as described above when a large difference (a difference equal to or greater than a prescribed value) has occurred between the first differentiation results D1 for adjacent test reproduction power values.

Then from the data obtained so far, the approximation curve APC is obtained. That is, the degradation characteristic is estimated.

Instead of determining the reproduction count leading to the prescribed amount of degradation by gradually reducing the test reproduction power as described above, the test reproduction power may be gradually increased, the reproduction count leading to the prescribed amount of degradation may be determined for each reproduction power, the twice differentiated data of the natural logarithm of the reproduction count leading to the prescribed amount of degradation obtained with each different reproduction power may be sequentially obtained, and even if the data take substantially zero values and lack a peak, decisions may be made as to whether a large difference (a difference equal to or greater than a prescribed value) has occurred between the first differentiation results D1 for adjacent test reproduction power values, as described above.

The decision in step S23 need not necessarily depend on the first or second derivative of the degradation data; whether to terminate test reproduction or not may also be decided by determining whether or not the measurements have been made with reproduction power belonging only to the high power region.

A list of test reproduction powers prestored in the ROM 220 in the central control unit 200 is used in step S21 in FIG. 3, but it is also possible to determine the necessary reproduction power (the reproduction power to be used in the next test reproduction) at the time of the decision in step S23, and perform an additional test reproduction with that reproduction power.

As described above, in the first embodiment, by using the curve given by equation (4) to approximate the relation between the reproduction power and the natural logarithm of the reproduction count (degradation count) at which the signal quality degrades by a prescribed amount, it is possible to accurately predict the optimum reproduction power at which the degradation of signal quality can be restricted to a prescribed amount or less at the guaranteed reproduction count RL even if data obtained by performing accelerated tests with high reproduction power are used. Since accelerated testing with high reproduction power is possible, the necessary number of test reproductions can be reduced, so that the optimum reproduction power can be predicted in a shorter time than with the Arrhenius plot used in general life-span tests.

As noted earlier, reproduction count corresponds to reproduction time, and both the degradation count ND(i) (the reproduction count at which the amount of degradation reaches the prescribed value) and the reproduction time corresponding thereto are used as life-span indexes.

Equation (4) can be rewritten as follows using the life-span index LP instead of the degradation count ND.

$$\ln(LP)=f\{(LA-LD)/(1+\exp(LB \times PR-LC))+LD\}+LE \qquad (4a)$$

LA, LB, LC, LD, and LE here are parameters corresponding to AA, BB, CC, DD, and EE in equation (4).

Second Embodiment

In the first embodiment, the optimum reproduction power is adjusted by test reproduction before data reproduction starts, and the time this takes before data can be reproduced is a problem. Therefore, in the second embodiment, test reproduction is carried out and the optimum reproduction power is adjusted by use of standby time during data reproduction.

The procedure for setting the reproduction power in the second embodiment will now be described with reference to FIG. 11. If the optical disc device used to implement the method of setting reproduction power in the second embodiment (thus, the optical disc device 100 in the second embodiment) is shown as a block diagram, it is as in FIG. 1, the same as in the first embodiment.

Figure 11:
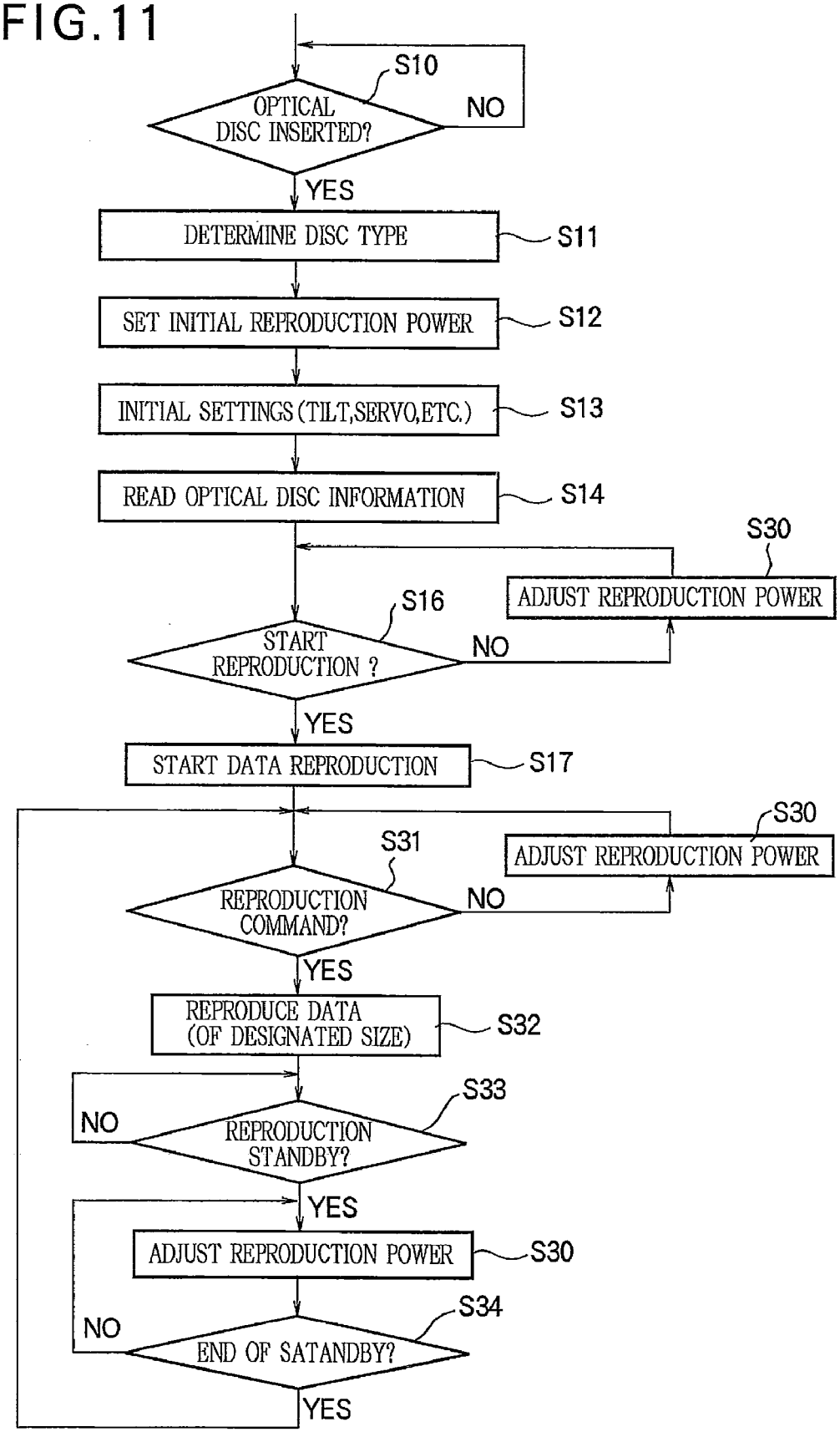
FIG. 11 is a flowchart illustrating an exemplary reproducing procedure for an optical disc device according to a second embodiment of the invention.

The process up to step S14 in FIG. 11, in which the optical disc information is read, is the same as the process shown in FIG. 2, so that its description will be omitted.

After the optical disc information is read out in step S14, if a reproduction command is given by a means not shown in the drawing (Yes in step S16), reading (playing) of intended data from the optical disc 500 begins in step S17. If a reproduction command is not given, by the means not shown in the drawing, in step S16, (if No), then the reproduction power is adjusted in step S30. The details of the processing in step S30 will be described later, but unlike step S15 in FIG. 2, a single execution of step S30 does not necessarily complete the test reproduction and calculation of the optimum reproduction power; in some cases, part of the processing in step S15, especially part of the test reproduction processing (step S22B in FIG. 3) that must be executed several times, is repeated in each occurrence of step S30 to collect the required number of test reproduction results, based on which the optimum reproduction power is calculated (step S25).

In general, the optical disc device 100 reads data from the optical disc 500 according to instructions from the host controller 400 that give a start address and a quantity of data to be read, and stores the data in the buffer memory 190. The host controller 400 decodes the reproduced data stored in the buffer memory 190, converts the data to audio and video data, and then outputs the converted data to the display device 450. The rate at which the optical disc device 100 reads the data from the optical disc 500 is higher than the rate at which the host controller 400 reads the data from the buffer memory 190 for output to the display device 450, so that in response to the reproduction command from the host controller 400, the central control unit 200 carries out control to avoid overflow or underflow in the buffer memory 190.

Periods during which a prescribed quantity of data is read from the optical disc 500 and stored in the buffer memory 190 therefore repetitively alternate with standby periods during which the reading of data from the optical disc 500 is suspended while the host controller 400 reads the data from the buffer memory 190 for video output. In the second embodiment, the test reproductions needed to determine the reproduction power are performed in the standby periods during which the reading of data from the optical disc 500 is suspended in order for the host controller 400 to perform video output, or during which reading of data from the optical disc 500 is suspended for some other reason.

After the reading of data starts in step S17, the optical disc device 100 waits for a reproduction command from the host controller 400 (step S31). If there is no reproduction command (as when, for example, a reproduction pause is imposed by a means not shown in the drawings), the reproduction power is adjusted in step S30.

If there is a reproduction command in step S31, data of a designated size are read in step S32, starting at a designated address.

Next, in step S33, whether the reproduction of the data has ended and a reproduction standby state has begun or not is decided, and if the reproduction standby state has begun (if Yes), reproduction power is adjusted in step S30.

Next, in step S34, whether the standby state will terminate or not is decided, and if the standby state will continue (if No), the reproduction power adjustment in step S30 continues. If the standby state will terminate in step S34 (if Yes), the process returns to step S31 to await a reproduction command from the host controller 400.

The decision as to whether the standby state will terminate or not in step S34 can be made by monitoring the state of the buffer memory 190, for example, and deciding to terminate the standby state when the amount of data in the buffer memory has been reduced to a level approaching empty. For example, if the amount of data stored in the buffer memory is less than the amount required for the host controller 400 to continue output to the display device 450 during the seek time from the test reproduction region (the address at which test reproduction is being performed) to the region in which the next reproduction will take place following the region in which the preceding reproduction was performed, a decision may be made to terminate the standby state and seek the region in which the next reproduction will be performed.

Next, the reproduction power adjustment processing (step S30) in the second embodiment will be described with reference to FIG. 12. Steps in FIG. 12 that correspond to or have the same content as steps in FIG. 3 are indicated by like reference characters.

First, in step S30A, a move to the i-th test region is made. Here test reproduction is being performed with a plurality of mutually different levels of reproduction power, and i is a parameter indicating that the current test reproduction will be the i-th reproduction; i is initialized to one (i=1) in FIG. 11 before the first test reproduction is performed.

Next, in step S30B, whether or not the value of i has changed from the preceding execution of step S30 is determined, and if it has changed (if Yes), the process proceeds to step S22A, in which the signal quality is measured as a reproduced signal quality before degradation (the reproduced signal quality before the start of the continuous still reproduction in the i-th test region, or the initial reproduction quality). When the reproduction power adjustment in step S30 is performed for the first time, the reproduced signal quality before degradation is measured in step S22A regardless of the presence or absence of a change in the value of i. After step S22A, the process proceeds to step S22B. If there is no change in the value of (if No) in step S30B, the process proceeds directly to step S22B.

In step S22B, continuous still reproduction is performed. If step S22B was arrived at via step S22A, the continuous still reproduction continues to be performed in the region in which the reproduction quality was measured last in step S22A. If step S22B was arrived at directly from step S30B, continued still reproduction begins in the region in which the reproduction quality was previously measured in step S22A.

Next, in step S30C, whether or not to suspend the test reproduction is decided. A decision to suspend test reproduction (Yes) is made when there is a reproduction command from the host controller 400, or when the central control unit 200 of the optical disc device 100 decides to terminate the standby state on the basis of the remaining amount of data in the buffer memory 190.

If it is decided to terminate the standby state in step S30C, the process proceeds to step S30D, in which the cumulative reproduction count NS(i) for the previously performed test reproductions is stored (separately for every i). Next, test reproduction is suspended in step S30E, the reproduction power is returned in step S30F to the initial reproduction power set in step S12 in FIG. 11, and the processing in step S30 terminates. If reproduction power has been set according to the inserted optical disc 500 in step S14, the reproduction power may be returned to the set reproduction power.

If it is decided not to suspend test reproduction (if No) in step S30C, whether or not to measure the reproduced signal quality is decided in step S22C. If it is decided not to measure the reproduction quality (if No) in step S22C, the process returns to step S22B. If the decision in step S22C is to measure the reproduction quality (if Yes), then in step S22D the reproduction quality is measured and the amount of degradation $QD(i, j)$ from the reproduction quality before degradation that was measured in step S22A is calculated.

The decision as to whether or not to measure the reproduction quality in step S22C is based, as in step S22C in FIG. 3, on whether or not the reproduction count ($NS(i)=NT(i, 1)$) from the start of the continuous reproduction in step S22B or the reproduction count $NT(i, j)$ after a measurement of the reproduction quality in the preceding step S22D has reached a prescribed value $NTL(i, j)$ (where j is a parameter indicating how many times reproduction quality has been measured with reproduction power $PR(i)$ during test reproduction).

Next, in step S22E, whether or not the amount of degradation $QD(i, j)$ determined in step S22D is greater than a previously specified prescribed value QDM is decided. If the amount of degradation $QD(i, j)$ determined in step S22D is greater than the prescribed value QDM (if Yes), the process proceeds to step S22F.

If the amount of degradation $QD(i, j)$ determined in step S22D is equal to or less than the prescribed value QDM (if No in step S22E), then in step S22G, the continuous still reproduction count $NS(i)$ for the reproduction power being used for test reproduction is compared with the upper limit number NSL of test reproductions. If the test reproduction count is still less than the preset upper limit (prescribed number) NSL (if No in S22G), the process returns to step S22B, in which the information in the test reproduction area is still-reproduced again, and step S22C and the subsequent processing are repeated.

If the reproduction count is equal to or greater than the preset upper limit number (prescribed count) NSL of test reproductions (if Yes in S22G), the process proceeds to step S22F.

In step S22F, the number of reproductions $ND(i)$ until the amount of degradation $QD(i, j)$ reaches the prescribed value QDM (the degradation count) is calculated, the calculated reproduction count $ND(i)$ is stored together with the corresponding reproduction power (i-th test reproduction power) $PR(i)$ in the RAM 230 in the central control unit 200, for example, (in association with the reproduction power PR(i)) and continuous still reproduction is terminated. after step S22F, the process proceeds to step S23.

The interval at which the reproduction quality is measured here in step S22D (the reproduction count NTL(i, j) from the j-th (j=1, 2, 3, . . . ) reproduction quality measurement to the next reproduction quality measurement) may be a preset fixed interval (a fixed reproduction count), or may be changed according to the amount of degradation of the reproduction quality that has been calculated in step S22D. for example, the interval may be shortened as the amount of degradation calculated in step S22D approaches the prescribed amount of degradation designated in step S22E.

In the decision in step S22E, if the difference between the amount of degradation QD(i, j) in reproduction quality and the predetermined reference amount of degradation QDM in reproduction quality is small (for example, if the degradation difference (QDM−QD(i, j)) is equal to or less than ten percent of the predetermined amount of reproduction quality degradation QDM and accordingly it can be determined that the desired amount of degradation would be reached with further reproduction), the decision as to whether or not reproduction has been performed the prescribed number of times NSL in step S22G may be skipped and the process may proceed to the next step S22F.

Next, in step S23, whether to terminate test reproduction or not is decided; if it is decided not to terminate test reproduction (if No), i is incremented by one in step S24 and the process returns to step S30A. As the value of i is incremented, the reproduction power PR(i) is also changed. Starting from the reproduction power PR(i) in the first test reproduction (i=1), the reproduction power may be changed to successively lower values or to successively higher values.

If it is decided to terminate the test reproduction (if Yes) in step S23, then in step S25 the optimum reproduction power is calculated by a computational formula and set, and the processing in step S30 is terminated.

The processing in step S23 and step S25 is described in detail in the first embodiment, so that a detailed description will be omitted here.

As described above, in the second embodiment, since the reproduction power adjustment, and especially the test reproduction therein, is carried out using the standby periods between times in which the optical disc device 100 reads the data from the optical disc 500, the optimum reproduction power can be predicted without prolonging the time from insertion of the optical disc 500 into the optical disc device 100 until the start of reproduction.

Figure 12:
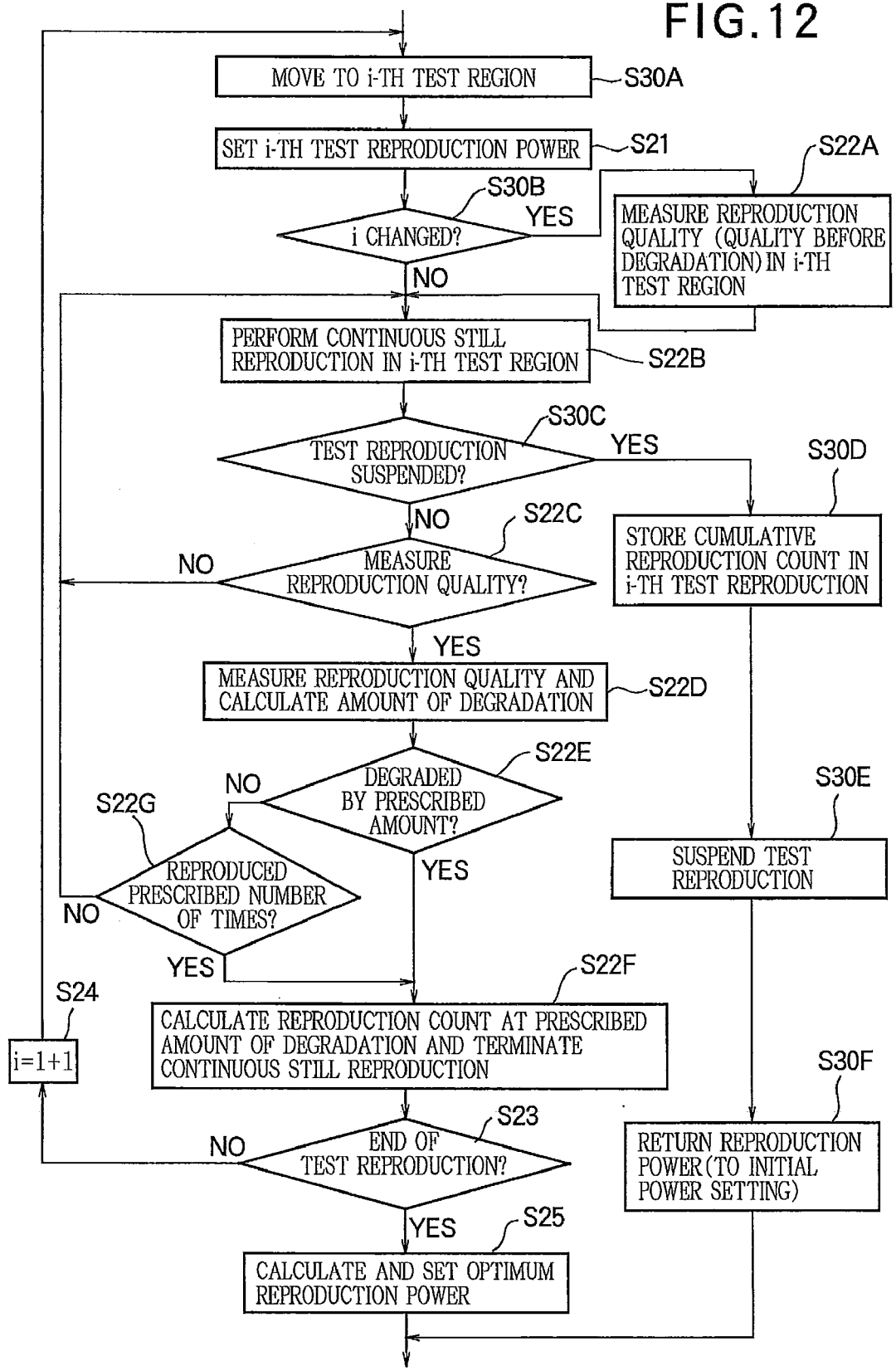
FIG. 12 is a flowchart illustrating an exemplary operating procedure in the reproduction power adjustment step S30 in FIG. 11.

Although the processing after the determination of the optimum reproduction power in the reproduction power adjustment in step S30 is not illustrated in the second embodiment, after the optimum reproduction power has been determined, the subsequent reproduction power adjustments in step S30 in FIG. 11 need not be performed; alternatively, additional test reproduction at lower reproduction powers than the reproduction powers used in the reproduction power adjustment in step S30 may be performed and the optimum reproduction power may be recalculated in step S25 in FIG. 12, enabling the optimum reproduction power to be determined more accurately (enabling a more appropriate value to be determined).

Third Embodiment

In the first and second embodiments, test reproduction is performed by use of the time before the optical disc device 100 reproduces data from the optical disc 500 or the standby time during data reproduction, whereby the optimum reproduction power at which the degradation of the signal quality at the guaranteed reproduction count RL can be restricted to a prescribed amount of degradation or less is determined. In the third embodiment, the optimum reproduction power is determined before shipment of the optical disc device 100 or during its development, and stored in the optical disc device 100 in, for example, the ROM 220 in the central control unit 200.

Figure 13:
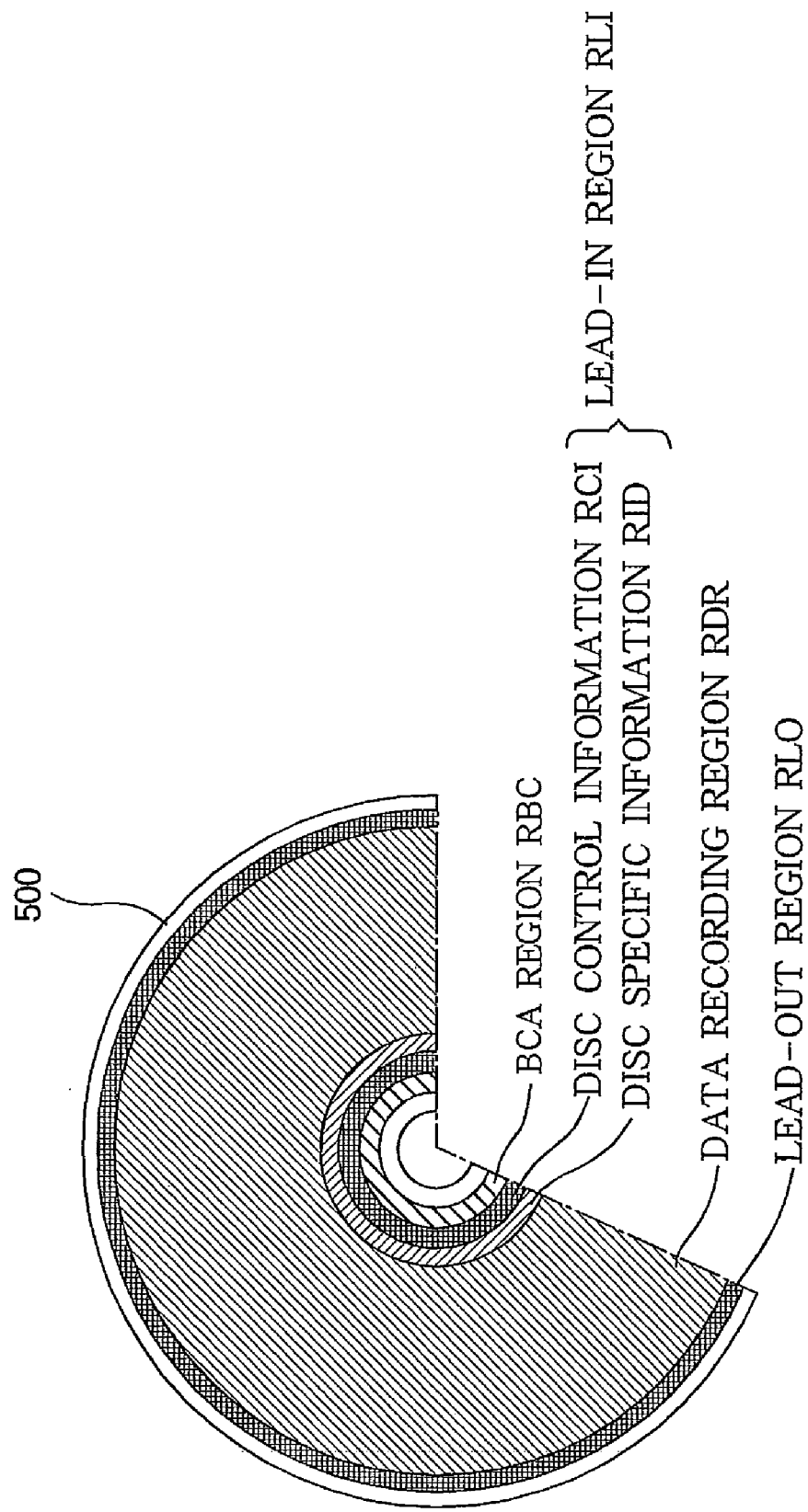
FIG. 13 is a diagram illustrating the storage areas in an optical disc used in a third embodiment of the invention.

In general, an optical disc 500 is divided into a BCA region RBC, a lead-in region RLI, a data-recording region RDR, and a lead-out region RLO as shown in FIG. 13. A unique number for media identification is recorded in the BCA region RBC on each disc as a bar-coded signal. The lead-in region RLI includes a region RCI for recording control information for controlling the disc and a region RID for recording the manufacturer and other disc specific information; in some cases the control information (RCI) and the disc specific information (RID) are also recorded in the lead-out region RLO.

In the third embodiment, the same test reproduction as in the first and second embodiments is carried out in advance for each disc specific information value, the relation between the reproduction power used in the test reproduction and the natural logarithm of the reproduction count (degradation count) ND at which the signal quality degrades by a prescribed amount is approximated by a curve according to equation (4), and the optimum reproduction power at which the degradation of the signal quality can be restricted to the prescribed amount of degradation or less at the guaranteed reproduction count RL is determined in advance; then the relation between the disc specific information and the determined optimum reproduction power is stored in table form, for example, in the ROM 220 in the central control unit 200 of the optical disc device 100.

When an optical disc 500 is inserted into the optical disc device 100 to be played, the optical disc device 100 reads the specific information of the optical disc 500 by use of the optical head 300, preamplifier, reproduced signal processing unit, data decoder 140, and central control unit 200, reads the optimum reproduction power stored in association with the same specific information as that of the inserted optical disc 500 from the table in the ROM 220, sets the optimum reproduction power (as the reproduction power setting (the target value)) in the RAM 230, and reproduces data from the optical disc 500 with the set reproduction power.

The optimum reproduction power is determined for the specific information of individual optical discs 500 in advance, before shipment of the optical disc device 100 (creating a table including the optimum reproduction power for each disc), and is stored in the ROM 220 of the optical disc device 100. This has to be done only when the model or specifications of the optical disc device 100 are changed (for example, when the optical specifications of the optical pickup 300 are changed).

In order to determine the optimum reproduction power for the optical disc device 100 before shipment, the actual optical disc device 100 may be used or, alternatively, another optical disc device with the same specifications or a test device with the same performance and characteristics as the actual optical disc device may be used.

The optimum reproduction power thus determined is stored as an initial value in the optical disc device, for example, in its ROM 220. When an optical disc is inserted, the optical disc device may read the initial value of the optimum reproduction power from the ROM 220 and then use the read setting of the optimum reproduction power to read the control information and perform actual playing.

Alternatively, only the reading of the control information and other processing (in steps S13 and S14) may be performed by using the read setting of the optimum reproduction power, and then test reproduction may be performed as described with reference to FIGS. 2 and 3 in relation to the first embodiment or as described with reference to FIGS. 11 and 12 in relation to the second embodiment to determine the actual optimum reproduction power, which is then written into the ROM 220.

The optimum reproduction power may be determined before shipment of the optical disc device by using the methods described in the first and second embodiments, but in order to determine the optimum reproduction power with more accuracy, measurements are preferably made with the low power region, curve region, and high power region in FIG. 8 included in the reproduction power used for test reproduction.

In the third embodiment, optimum reproduction power is stored in correspondence to the individual disc specific information in the lead-in region, but, for example, the unique number for media identification recorded for each disc in the BCA region RBC may be used, or other information capable of identifying the disc may be used.

The optimum reproduction power for the optical disc device used in the third embodiment may also be determined by performing test reproduction again by use of the method of the first or second embodiment.

Fourth Embodiment

In the first and second embodiments, test reproduction is carried out by use of the time before the optical disc device 100 starts to reproduce data from the optical disc 500 or the standby time during data reproduction, whereby the reproduction power (the optimum reproduction power PRo) at which the degradation of signal quality at the guaranteed reproduction count RL can be restricted to a prescribed amount of degradation or less is determined, but the temperature inside the optical disc device is not taken into consideration. Since the amount of degradation of signal quality also varies with temperature, if the temperature in the optical disc device 100 changes, signal degradation exceeding the prescribed amount might occur with the reproduction power as determined in the first or second embodiment. In the fourth embodiment, therefore, a correction of the optimum reproduction power (i.e., a correction of the reproduction power setting) is carried out responsive to temperature variation.

Figure 14:
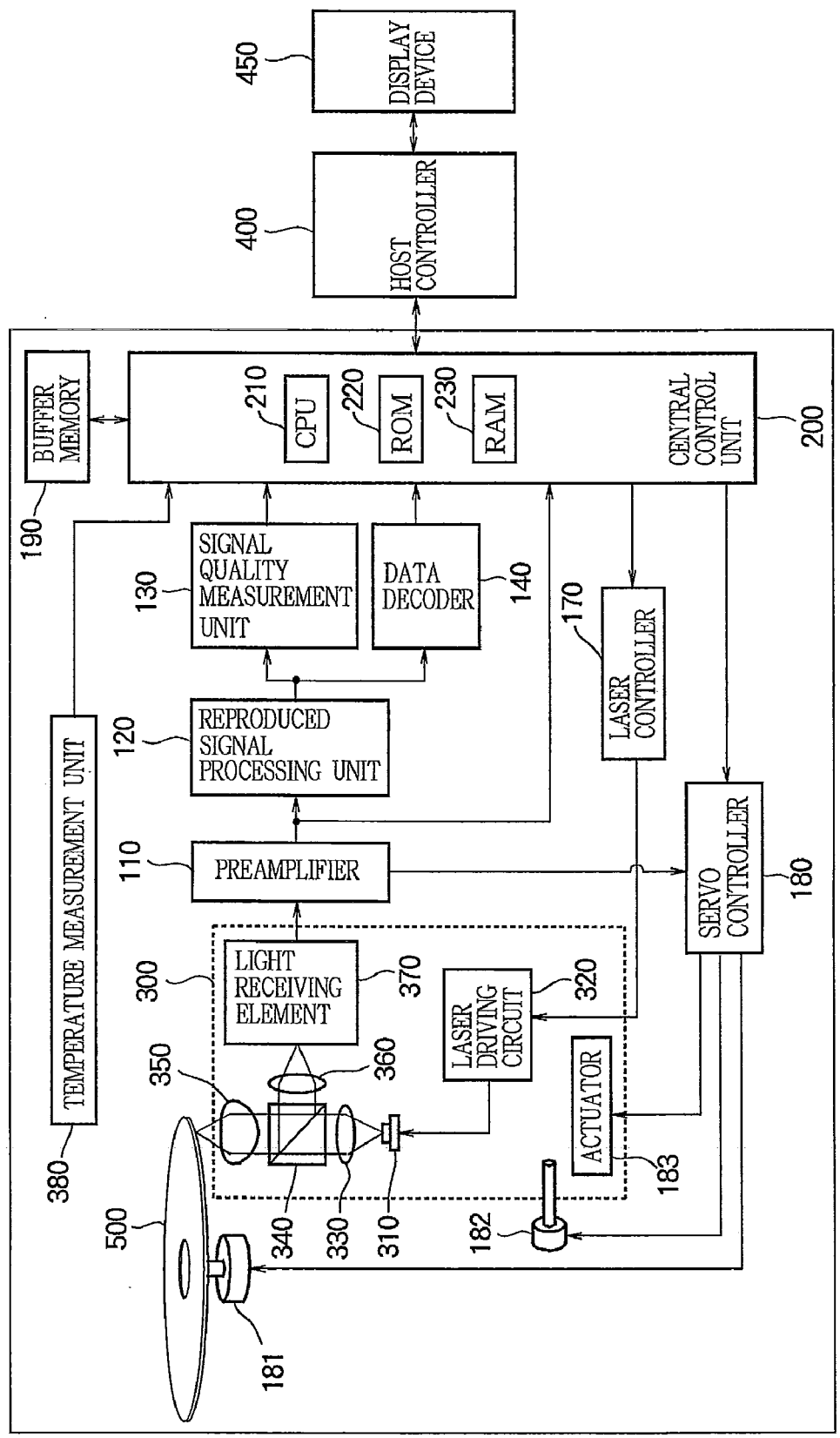
FIG. 14 is a block diagram illustrating an optical disc device according to a fourth embodiment of the invention.

The optical disc device 100 in the fourth embodiment includes a temperature measurement unit 380 in addition to the components of the optical disc device 100 in FIG. 1, as shown in FIG. 14. The temperature measurement unit 380 uses a thermistor, for example, to measure the temperature inside the optical disc device 100. The thermistor is preferably placed on the optical head 300 or in a position near the optical head 300 to measure the temperature of the optical head 300, especially near its laser 310. The temperature measurement unit 380 is not limited to the use of a thermistor; it may be any element or device that can measure temperature.

The procedure for correcting the reproduction power responsive to temperature variation in the fourth embodiment will now be described with reference to FIG. 15. In the reproduction procedure in the fourth embodiment, the processing up to the reproduction power adjustment in step S15 is the same as in FIG. 2, so that illustrations and descriptions of the processing up to step S14 will be omitted.

In the reproduction power adjustment in step S15, as described in the second embodiment, the maximum reproduction power PRm (the reproduction power at which the degradation count ND reaches the guaranteed reproduction count RL) is determined, and a power value equal to or (allowing a margin) slightly less than that value is set as the optimum reproduction power PRo. In other words, a reproduction power at which the degradation of the reproduced signal at the guaranteed reproduction count RL can be reduced to a prescribed value or less is set as the optimum reproduction power PRo.

Next, in step S40, the temperature T1 of the optical disc device 100 is measured by the temperature measurement unit 380 and stored in the RAM 230 in the central control unit 200, for example, as a reference temperature TRA. The optimum reproduction power PRo determined in step S15 is stored in the RAM 230 in the central control unit 200, for example, as a reference reproduction power PRA.

After step S40, when a reproduction command is given by a means not shown in the drawing (step S16), the reading (playing) of the intended data from the optical disc 500 with the optimum reproduction power PRo as adjusted and set in step S15 starts in step S17. Although this is not shown in the drawing, the subsequent processing is performed concurrently with the reading of data that begins in step S17; processing other than the data reproduction processing will be described below.

Next, in step S41, concurrently with the reading of data, the temperature T2 inside the optical disc device 100 is measured using the temperature measurement unit 380. The operation in step S41 need not be performed constantly; it may be performed, for example, when a preset time or longer has elapsed from when the temperature was measured before. If other processing loads on the optical disc device 100 are not large, the temperature measurement in step S41 may be performed at shorter time intervals.

After temperature T2 is measured in step S41, the difference (the absolute value of the difference, or variation amount) between the reference temperature TRA and the temperature T2 measured in step S41 is determined in step S42 (when step S42 is performed for the first time, the temperature T1 measured in step S40 is used as the reference temperature TRA), and whether the temperature difference is a prescribed temperature difference $\Delta TA$ or more (e.g., 10° C. or more) or not is determined. If the temperature difference is less than the prescribed temperature difference $\Delta TA$ (if No), nothing is done and data reproduction is continued. If the temperature difference is equal to or greater than the prescribed temperature difference $\Delta TA$ (if Yes), the reproduction power is corrected in step S43. In this reproduction power correction step S43, the optimum reproduction power PRo is corrected. The reproduction power correction will be described later. Then, in step S44, the reference temperature TRA is updated to the temperature T2 measured at this time in step S41 and the reference reproduction power PRA is updated to the optimum reproduction power PRo as determined in step S43.

Next, in step S45, the optimum reproduction power PRo as corrected in step S43 is set (the corrected optimum reproduction power is set as a new setting, that is, the setting is updated), and the newly set value is used to read data. Although not shown in the drawing, when the reproduction power is set in step S45, the reading of data from the optical disc 500 is suspended while the reproduction power is set. The reading of data need not be forcibly suspended; it is possible to wait for a standby time in the reading of data (a time during which data are not being read) and then set the reproduction power.

Figure 15:
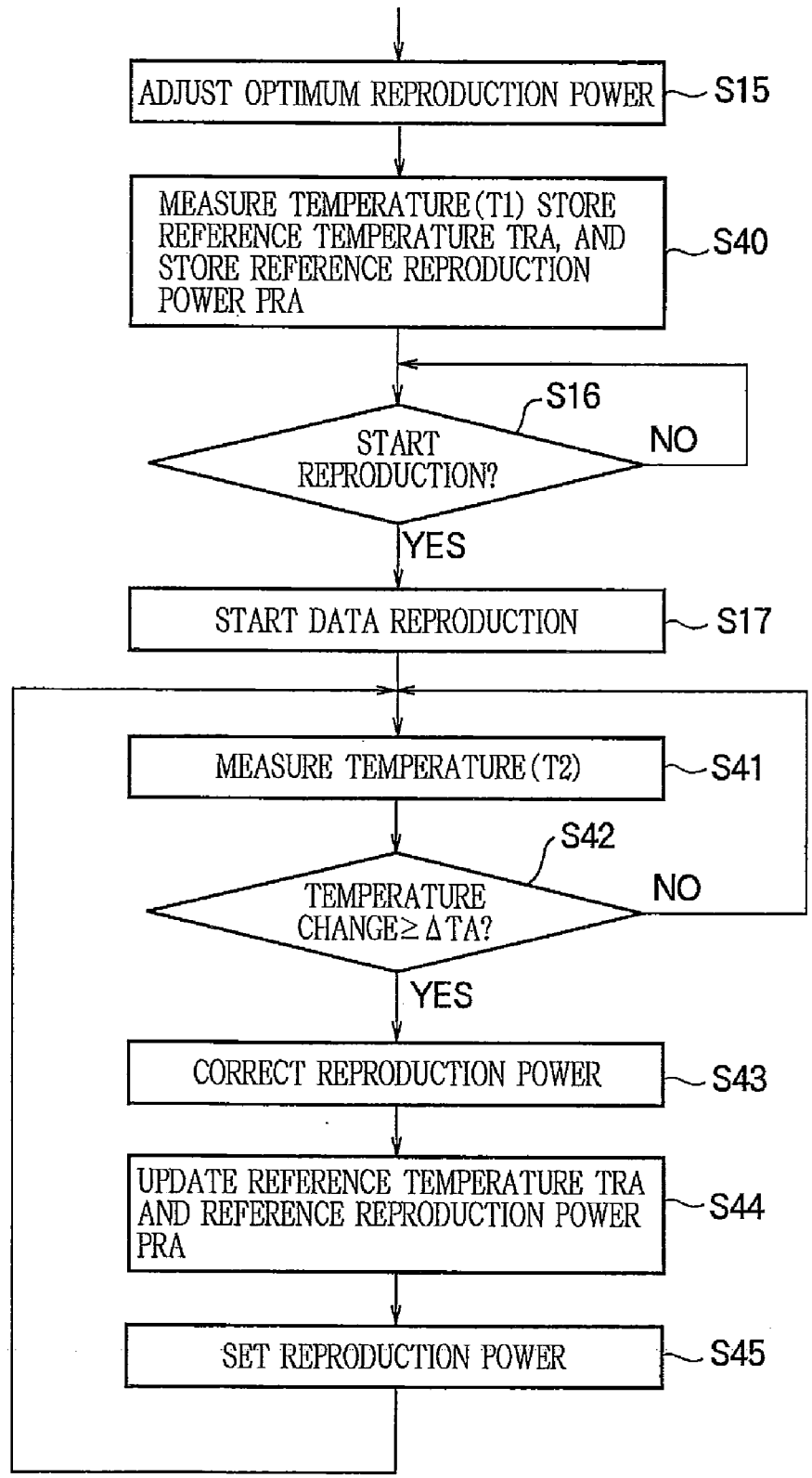
FIG. 15 is a flowchart illustrating an exemplary reproducing procedure for the optical disc device in the fourth embodiment.

In the processing in FIG. 15, the processing in steps S40 and S41 is performed by the temperature measurement unit 380 and central control unit 200, and the processing in steps S42, S43, S44, and S45 is performed by the central control unit 200.

Figure 16:
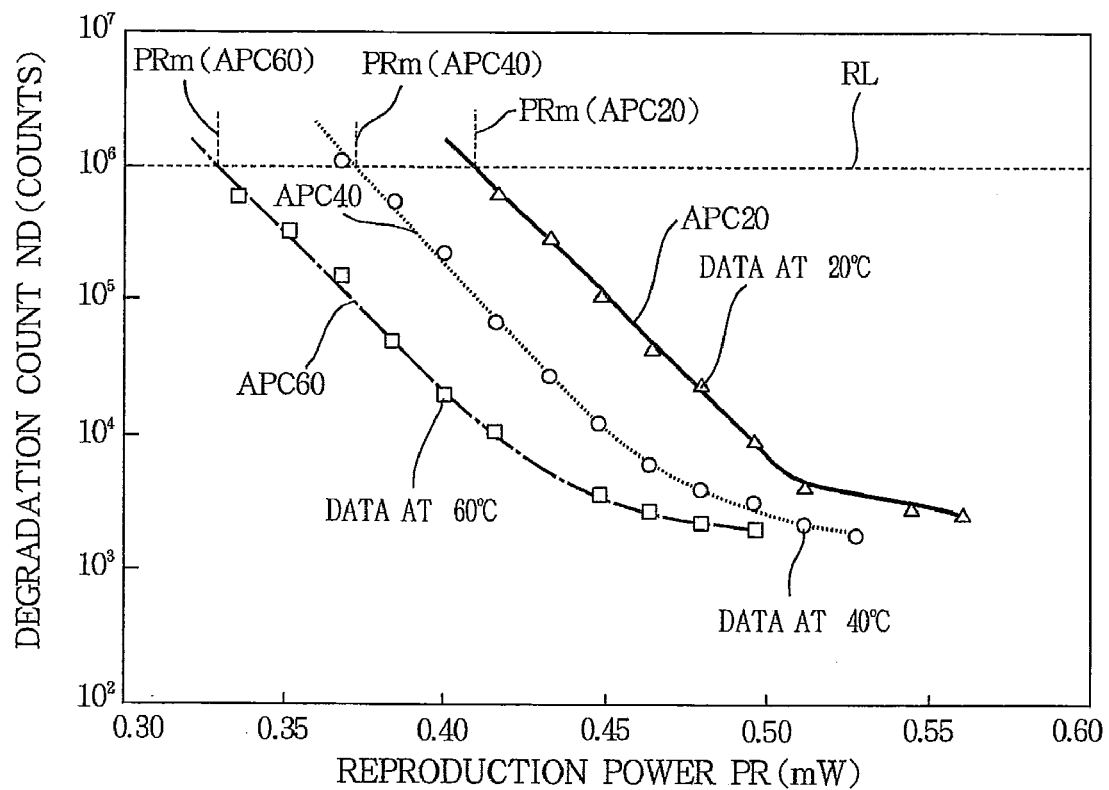
FIG. 16 is a graph illustrating the relation between reproduction power and degradation count ND (life-span reproduction count: the number of reproductions until reproduced signal quality is degraded by a prescribed amount), obtained by repetitive reproduction from the optical disc at three different temperatures.

Next, the reproduction power correction in step S43 will be described with reference to FIGS. 16 and 17. FIG. 16 illustrates relations (measured values) between the reproduction power PR and degradation count ND at three different temperatures, and approximating curves APC20, APC40, APC60 expressed by equation (4). In this graph, the triangular marks and solid line APC20 illustrate a case in which the temperature in the optical disc device was 20° C.; the triangular marks indicate measured values and the solid line APC20 indicates the approximation curve. The round marks and dotted line APC40 illustrate a 40° C. case; the round marks indicate measured values and the dotted line indicates the approximation curve. The square marks and chain line APC60 illustrate a 60° C. case; the square marks indicate measured values and the chain line indicates the approximation curve.

In FIG. 16, the maximum reproduction power (the reproduction power at which the degradation count ND reaches the guaranteed reproduction count RL) for the curves APC20, APC40, APC60 are respectively indicated by the symbols PRm (APC20), PRm (APC40), PRm (APC60).

FIG. 16 shows that as the temperature increases, the relation between the reproduction power PR and the degradation count ND shifts to the left in the drawing; degradation tends to occur even at low reproduction power. That is, the maximum reproduction power PRm is seen to decrease as the temperature increases.

Figure 17:
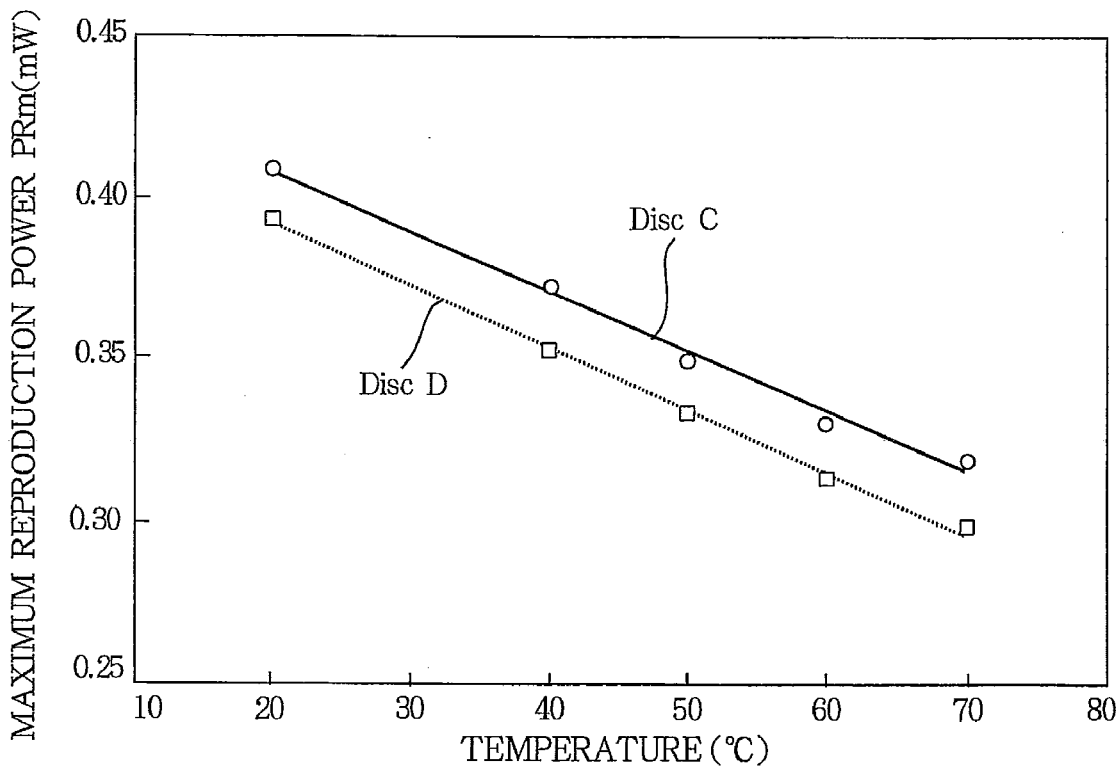
FIG. 17 is a graph illustrating the relation between temperature and maximum reproduction power PRm.

FIG. 17 illustrates the relations between temperature and maximum reproduction power PRm for two different types of BD-RE discs. Data for a Disc C are indicated by round marks and a solid line; data for a Disc D are indicated by square marks and a dotted line; the round and square marks indicate measured values and the solid and dotted lines indicate approximation lines obtained by a first-order approximation to the measured values. FIG. 17 shows that the relation between temperature and maximum reproduction power PRm can be approximated linearly. It can be seen that the slopes of the approximation lines for the two different types of BD-RE discs are substantially the same. The slope CT of the approximation line is determined with the optical disc device 100 in advance and stored in the RAM 230 of the central control unit 200, for example. The slope CT has to be stored only when the model or specifications of the optical disc device 100 are changed (e.g., when the optical specifications of the optical pickup 300 are changed).

Since the optimum reproduction power PRo is a value corresponding to the maximum reproduction power PRm, the relation between temperature and the optimum reproduction power is similar to the relation between temperature and the maximum reproduction power; especially when the optimum reproduction power can be obtained by multiplying the maximum reproduction power by a prescribed constant, the slope of the approximation line representing the relation between the temperature and the optimum reproduction power is identical to the slope of the approximation line representing the relation between the temperature and the maximum reproduction power. In the following description, it will be assumed that the optimum reproduction power is obtained by multiplying the maximum reproduction power by a prescribed coefficient, and the slope of the approximating line representing the relation between temperature and the optimum reproduction power is identical to the slope of the approximating line representing the relation between temperature and the maximum reproduction power.

The above results are used to carry out the reproduction power correction in step S43. Using the reference reproduction power PRA, the reference temperature TRA, the temperature T2 measured just before step S42 in step S41 (the step in which the temperature used in the decision in step S42 is measured), and the slope CT of the approximation line representing the relation between the temperature and the maximum reproduction power, the corrected optimum reproduction power PRou (the optimum reproduction power as corrected responsive to temperature variation) can be obtained by the following equation.

$$PRou = CT \times (T2 - TRA) + PRA \qquad (6A)$$

Here the value of the reference temperature TRA and the value of the reference reproduction power PRA as updated in step S44 are used in equation (6A) when the processing in step S43 is performed next, but the corrected optimum reproduction power PRou may also be obtained from equation (6A) by using the temperature T1 obtained in step S40 as the reference temperature TRA and fixing the reference reproduction power PRA at the optimum reproduction power PRo obtained in step S15.

Figure 18:
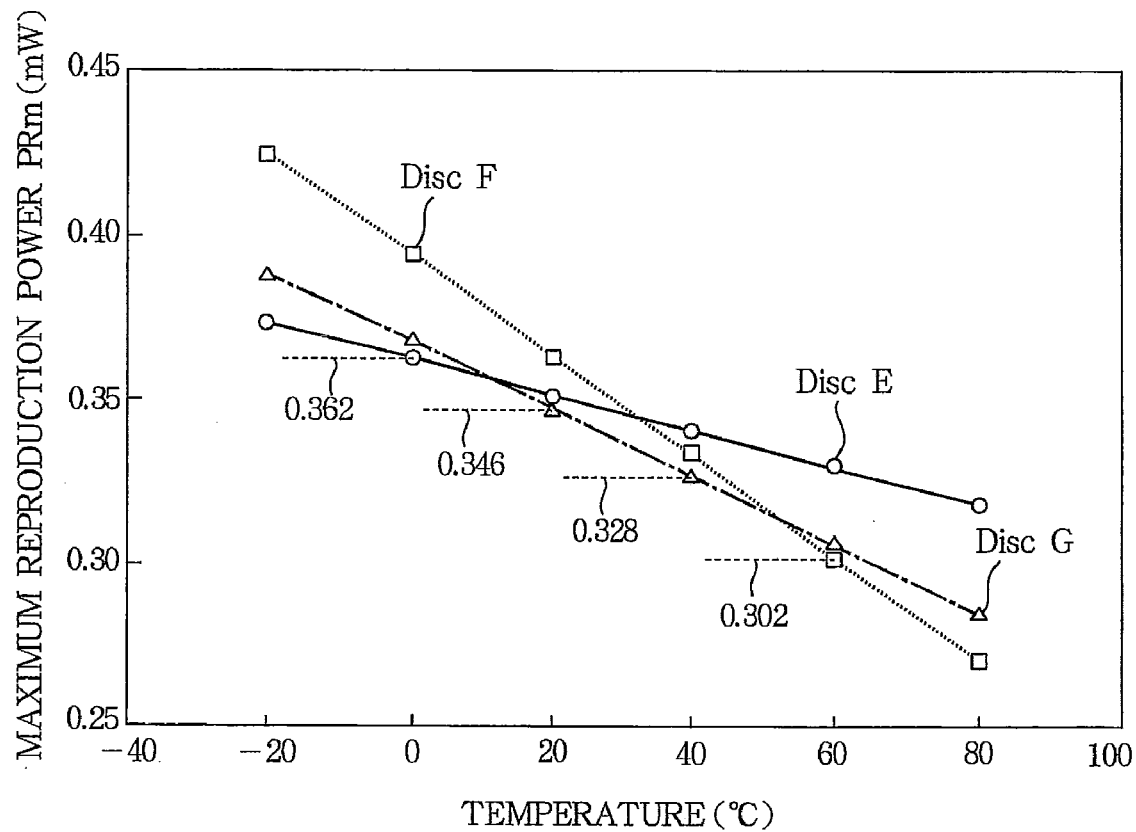
FIG. 18 is a graph illustrating exemplary relations between temperature and maximum reproduction power PRm.

Although it was shown in FIG. 17 that the relations (the slopes of the approximation lines) between temperature and the maximum reproduction power for two different types of BD-RE discs are substantially the same, there is a possibility that the relation (the slope of the straight approximation lines) between temperature and maximum reproduction power PRm might differ according to the optical disc characteristics. FIG. 18 shows exemplary relations (the slopes of the approximation lines) between the temperature and the maximum reproduction power PRm when these relations differ according to the type of optical disc. In this graph, the round marks and solid line are for a Disc E, the square marks and dotted line are for a Disc F, and the triangular marks and chain line are for a Disc G. In this case, the slope CT of the approximation line representing the relation between the temperature and the maximum reproduction power PRm is stored in correspondence to the individual specific information of the optical discs in the optical disc device 100, for example, in the ROM 220 of the central control unit 200. In FIG. 18, for example, the slopes of the approximation lines for Disc E, Disc F, and Disc G are stored as CT(E), CT(F), and CT(G), respectively, in the optical disc device 100 (ROM 220). In reproduction from optical discs, the optimum reproduction power PRou as corrected according to temperature variation may be obtained by use of equation (6A) and the slope information of the approximation line corresponding to the specific information of the inserted optical disc.

When the slope CT of the approximation line differs depending on the optical disc, a relation expressing the slope CT of the approximation line of each optical disc is stored together with the specific information of the optical disc (in association with the specific information) in table form, for example, in the ROM 220 in the central control unit 200 of the optical disc device 100. Alternatively, among the different slopes of the approximation lines that have been obtained for different optical discs, the slope with the greatest absolute value and the slope with the smallest absolute value may be stored in the ROM 220 in the central control unit 200 of the optical disc device 100.

In this case, for a disc whose specific information has not been stored in the table, the reproduction power may be corrected by using the slope with the greatest absolute value when the temperature in the optical disc device 100 is higher than the temperature measured in step S40 (or the temperature determined from the temperature measurement in the preceding step S41), and by using the slope with the smallest absolute value when the temperature in the optical disc device 100 is lower than the temperature measured in step S40.

That is, when the reproduction power correction in step S43 is performed as a result of an increase in the temperature of the optical disc device 100, the slope of the approximation line with the greatest absolute value is used to perform the correction by equation (6A). In contrast, when the reproduction power correction in step S43 is performed as a result of a decrease in the temperature of the optical disc device 100, the slope of the approximation line with the smallest absolute value may be used to perform the correction by equation (6A). This causes a lower reproduction power than necessary to be set for some optical discs, but for all optical discs, it can prevent the degradation count ND from being less than the guaranteed reproduction count RL.

In step S43, the optimum reproduction power PRo is corrected responsive to temperature variation by using equation (6A) and the corrected value is set as the optimum reproduction power PRo.

Although the optimum reproduction power PRo is set as the reference reproduction power PRA in step S40, the maximum reproduction power PRm determined in step S15 may be set instead. In this case, the result corrected by using the following equation (6B), which is similar to equation (6A), in step S43 becomes the maximum reproduction power PRmu.

$$PRmu = CT \times (T2-TRA) + PRA \quad (6B)$$

(where PRA=PRm)

As described above, in the fourth embodiment, the relation between the maximum reproduction power PRm and the temperature is investigated in advance, and the optimum reproduction power is corrected responsive to temperature variation by using equation (6A) or (6B), whereby even if the temperature has changed, the optimum reproduction power PRo for that temperature can be obtained, making it possible to prevent signal quality from being degraded by a prescribed amount or more.

In the fourth embodiment, whether a prescribed temperature difference is exceeded or not is decided in step S42, and the reproduction power is corrected in step S43. The reproduction power correction may be performed following the temperature measurement in step S41, and if the reproduction power changes by a prescribed value or more (for example, the smallest controllable step or more), the processing in step S44 and step S45 may be performed.

In order to determine the relation between temperature and the maximum reproduction power before the shipment of an optical disc device, the method described in relation to the first or second embodiment may be used. But in order to obtain the optimum reproduction power with greater accuracy, the reproduction power used for test reproduction is preferably measured in a range including the low power region, curve region, and high power region.

Although the processing in the fourth embodiment is shown in FIG. 15 as being performed after the start of data reproduction in step S17, the processing from step S41 to step S45 may be performed during the standby time before the start of data reproduction.

In the fourth embodiment, the relation between the temperature and the maximum reproduction power PRm is approximated linearly as shown in FIG. 17. But any type of approximation may be used provided it can approximate the relation. When a nonlinear approximation is performed, however, equation (6A) or equation (6B) and the stored coefficients must be changed according to the approximation used.

The above reproduction power correction process in step S43 may be described as a process for changing the reproduction power responsive to a change in temperature.

Fifth Embodiment

In the fourth embodiment, the reproduction power is corrected responsive to temperature variation in the optical disc device 100 by a calculation based on a previously investigated relation between the maximum reproduction power PRm and temperature. The relation between the maximum reproduction power PRm and temperature can be determined only for a specific optical disc device 100 and a limited number of optical discs 500, so that it may differ due to individual differences between optical disc devices 100 and optical discs 500, and the effect of these differences becomes particularly apparent when there are large temperature variations. Therefore, in the fifth embodiment, a follow-up reproduction power adjustment is performed responsive to temperature variation.

If the optical disc device 100 according to the fifth embodiment is shown in a block diagram, it appears as in FIG. 14.

The reproduction power modification process performed in response to the temperature after a temperature change in the fifth embodiment will now be described with reference to FIG. 19. In the reproduction procedure in the fifth embodiment, the processing up to the reproduction power adjustment in step S15 is the same as in FIG. 2, so that illustrations and descriptions of the processing up to step S14 will be omitted.

The processing in step S41 and from step S42 to step S45 is generally the same as in FIG. 15. the processing in step S50 is generally the same as step S40, but differs as described below.

In the reproduction power adjustment in step S15, as described in relation to FIG. 2, the maximum reproduction power PRm (the reproduction power at which the degradation count ND reaches the guaranteed reproduction count RL) is determined, and a power value identical to or (allowing a margin) slightly less than that value is set as the optimum reproduction power PRo. In other words, a reproduction power at which degradation of the reproduced signal at the guaranteed reproduction count RL can be restricted to a prescribed value or less is set as the optimum reproduction power PRo.

Next, in step S50, the temperature T1 of the optical disc device 100 is measured by using the temperature measurement unit 380 and the measurement is stored as reference temperatures TRA and TRB in, for example, the RAM 230 in the central control unit 200. The maximum reproduction power PRm that was determined in step S15 is stored as reference reproduction powers PRB and PRC in, for example, the RAM 230 in the central control unit 200.

After step S50, if a reproduction command is given (step S16) by a means not shown the drawing, reading (playing) of intended data from the optical disc 500 by use of the optimum reproduction power PRo as adjusted and set in step S15 begins in step S17. Although not shown in the drawing, the subsequent processing is performed concurrently with the reading of data that began in step S17; the processing other than data reproduction will be described.

Next, in step S41, concurrently with the reading of data, the temperature T2 inside the optical disc device 100 is measured using the temperature measurement unit 380. The operation in step S41 need not be performed constantly; it may be performed, for example, when a preset time or longer has elapsed from when the temperature was measured before. If other processing loads on the optical disc device 100 are not large, the temperature measurement in step S41 may be performed at shorter time intervals.

After temperature T2 is measured in step S41, the temperature difference (the absolute value of the difference, or the amount of variation) between reference temperature TRB and the temperature T2 measured in step S41 is determined in step S51 and whether or not the temperature difference is equal to a prescribed temperature difference ΔTB or more (e.g., 20° C. or more) is determined. If the temperature difference is less than the prescribed temperature difference ΔTB (if No), the processing from step S42 to step S45 is performed. The processing from step S42 to step S45 is the same as in the fourth embodiment, so that its description will be omitted. The temperature difference ΔTB used in step S51 is preferably greater than the temperature difference ΔTA used in step S42.

In step S51, if the temperature difference is equal to or greater than the temperature difference ΔTB (if Yes), the reproduction power is adjusted in step S52. The processing in step S52 is the same as in step S15. In the reproduction power adjustment in step S52, not only the optimum reproduction power PRo but also the maximum reproduction power PRm is obtained (in the course of determining the optimum reproduction power PRo).

After step S52, the temperature T3 of the optical disc device 100 is measured by use of the temperature measurement unit 380 in step S54. In step S55, the reference temperatures TRA and TRB are updated to the temperature T3 measured in step S54, and the reference reproduction powers PRB and PRC are updated to the reproduction power (maximum reproduction power PRm) determined in step S53. The subsequent decision in step S51 as to whether or not it is necessary to repeat the adjustment of the optimum reproduction power is accordingly based on the temperature at which the test reproduction was performed to adjust the reproduction power in step S52 (based on whether the amount of variation with respect to that temperature is equal to or greater than a prescribed value or not).

Step S54 may be omitted, and the temperature T2 measured in step S41 may be replaced with the temperature T3 in step S55. In this case, the subsequent decision in step S51 as to whether or not it is necessary to repeat the adjustment of the optimum reproduction power is based on the temperature at which the test reproduction was performed to adjust the reproduction power in step S15.

Next, in step S45, the optimum reproduction power PRo corresponding to the maximum reproduction power determined in step S52 is set (the determined optimum reproduction power PRo is set as a new setting, that is, the setting is updated), and the newly set value is used in the subsequent reading of data. Although not shown in the drawing, when the reproduction power is set in step S45, the reading of data from the optical disc 500 is suspended while the reproduction power is being set. The reading of data need not be forcibly suspended; it is possible to wait for a standby time in the reading of data (a time during which data are not being read) and then set the reproduction power.

In correcting the reproduction power in step S43, as in the fourth embodiment, a previously investigated relation (the slope of the approximation line) between the temperature and the maximum reproduction power is used. At this time, since the maximum reproduction power is stored as reference reproduction powers PRB and PRC, equation (6B) is used for the correction. In this case, if the slope of the approximation line differs from one optical disc to another as shown in FIG. 18, the slope of the approximation line for each optical disc may be stored in the ROM 220 in the optical disc device 100; alternatively, only the two slopes with the greatest and smallest absolute values among the slopes of the approximation lines for different types of optical discs may be stored in the ROM 220 in the optical disc device 100.

In this case, when the reproduction power adjustment in step S43 is performed as a result of an increase in the temperature of the optical disc device 100, the slope of the approximation line with the greatest absolute value is used to perform the correction according to equation (6B). In contrast, when the reproduction power adjustment in step S43 is performed as a result of a decrease in the temperature of the optical disc device 100, the slope of the approximation line having the smallest absolute value may be used to perform the correction according to equation (6B). This causes a lower reproduction power than necessary to be set for some optical discs, but for all optical discs, it can prevent the degradation count ND from being less than the guaranteed reproduction count RL.

The optimum reproduction power PRo set responsive to temperature variation in the reproduction power adjustment in step S52 is used for subsequent reproduction, so that the degradation count ND can be kept from being less than the guaranteed reproductions due to a too high reproduction power, and the reproduction power can also be kept from being set to such a low level value that reproduction from the optical disc is impossible.

Figure 19:
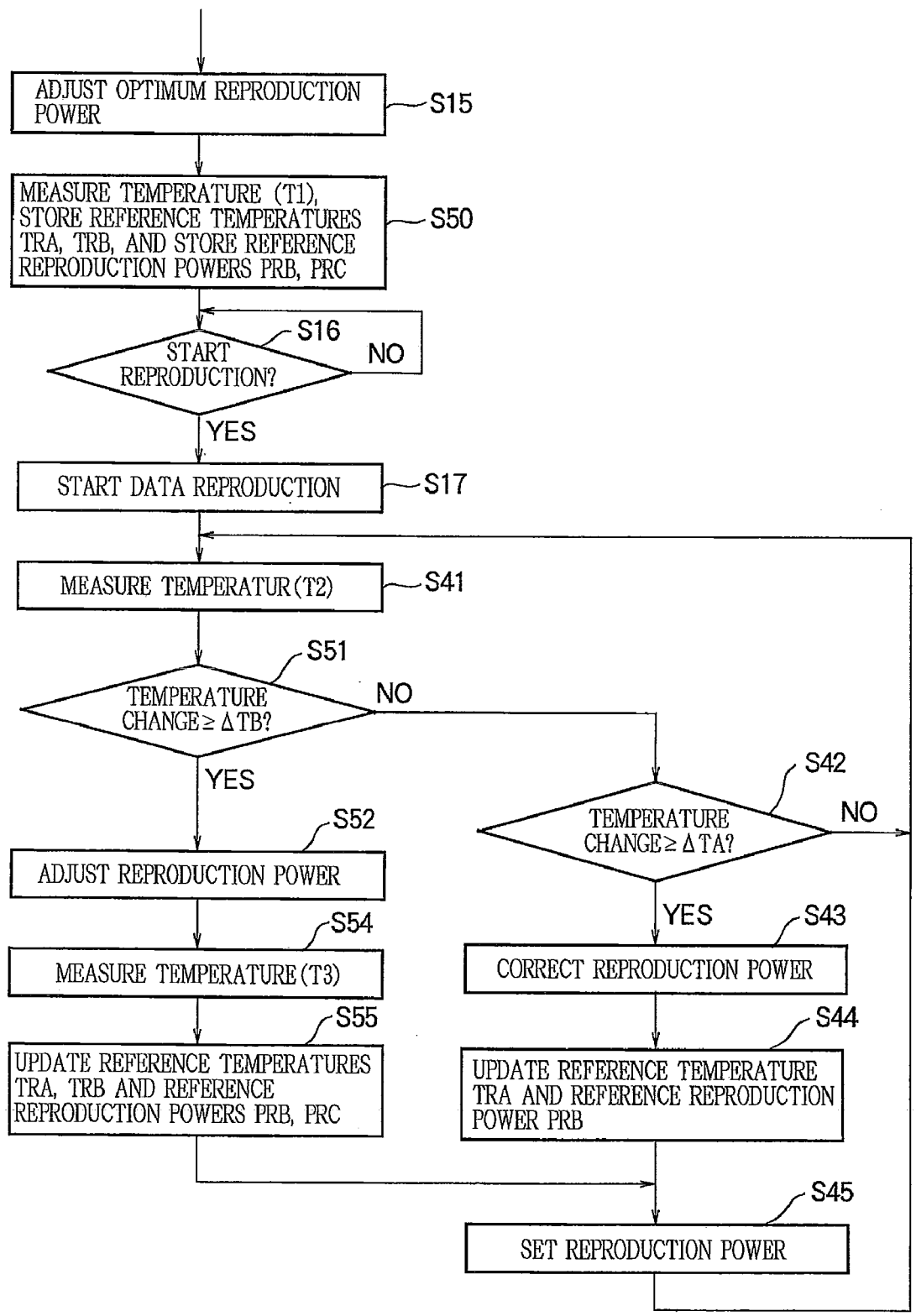
FIG. 19 is a flowchart illustrating an exemplary reproducing procedure for an optical disc device in a fifth embodiment of the invention.

In FIG. 19, the processing in steps S50, S41, and S54 is performed by the temperature measurement unit 380 and the central control unit 200; the processing in steps S42, S43, S44, S45, S51, S53, and S55 is performed by the central control unit 200.

Figure 20:
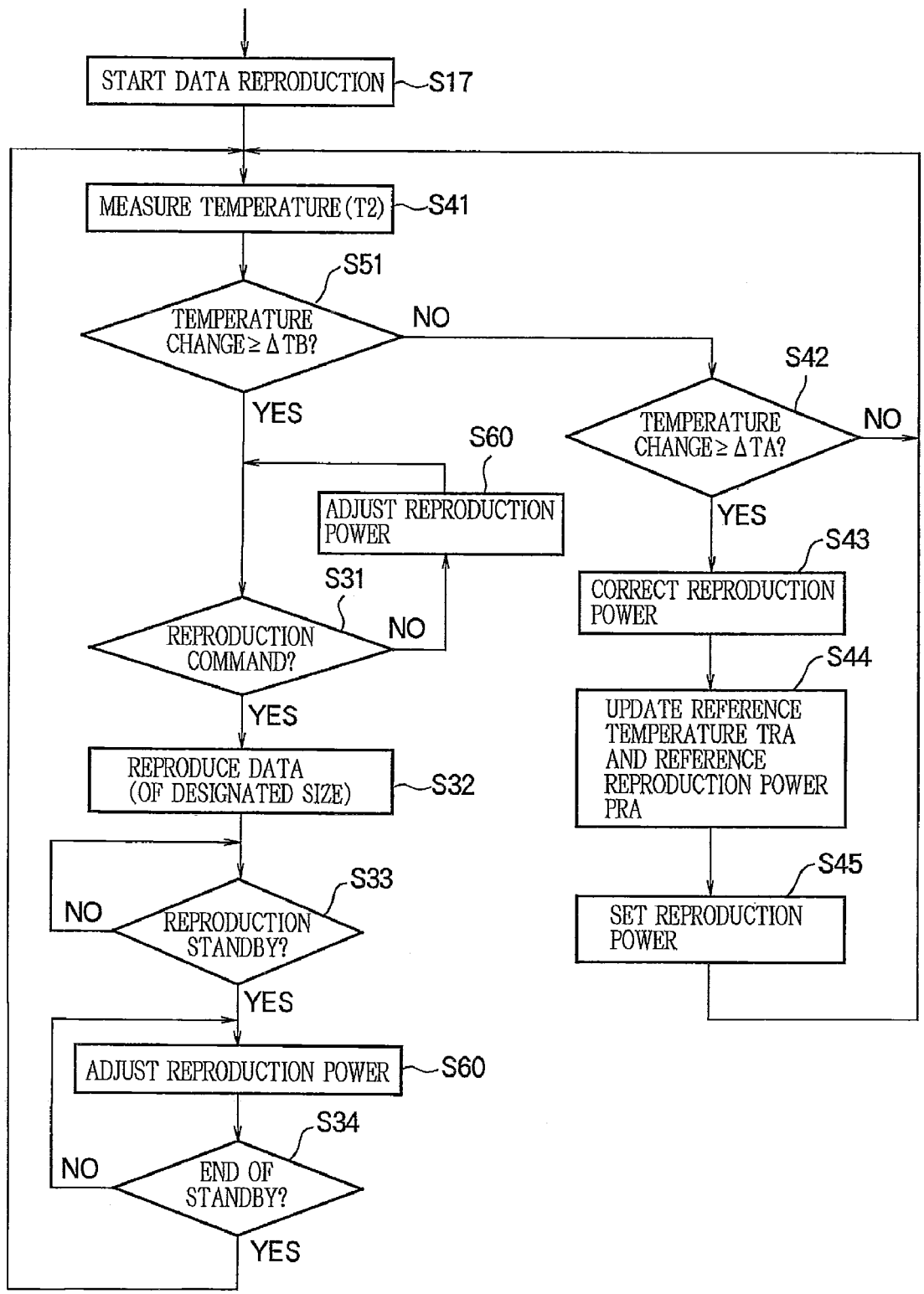
FIG. 20 is a flowchart illustrating an exemplary reproducing procedure for an optical disc device in a variation of the fifth embodiment of the invention.

In the above example, if the temperature difference is equal to or greater than the prescribed temperature difference ΔTB (if Yes) in step S51, the reproduction power adjustment is performed in step S52. But the processing procedure following a Yes decision in step S51 may be as shown in FIG. 20. In the procedure shown in FIG. 20, as described with reference to FIG. 11 in relation to the second embodiment, the reproduction power adjustment, especially the test reproduction for this purpose, is performed intermittently; like reference characters in FIGS. 20 and 11 indicate like processes.

First, if the temperature difference is equal to or greater than the prescribed temperature difference ΔTB (if Yes) in step S51, the presence or absence of a reproduction command is checked in step S31; if there is no reproduction command (which corresponds to a case in which, for example, reproduction is suspended by a means not shown in the drawings), the reproduction power is adjusted in step S60.

Figures 21, 22:
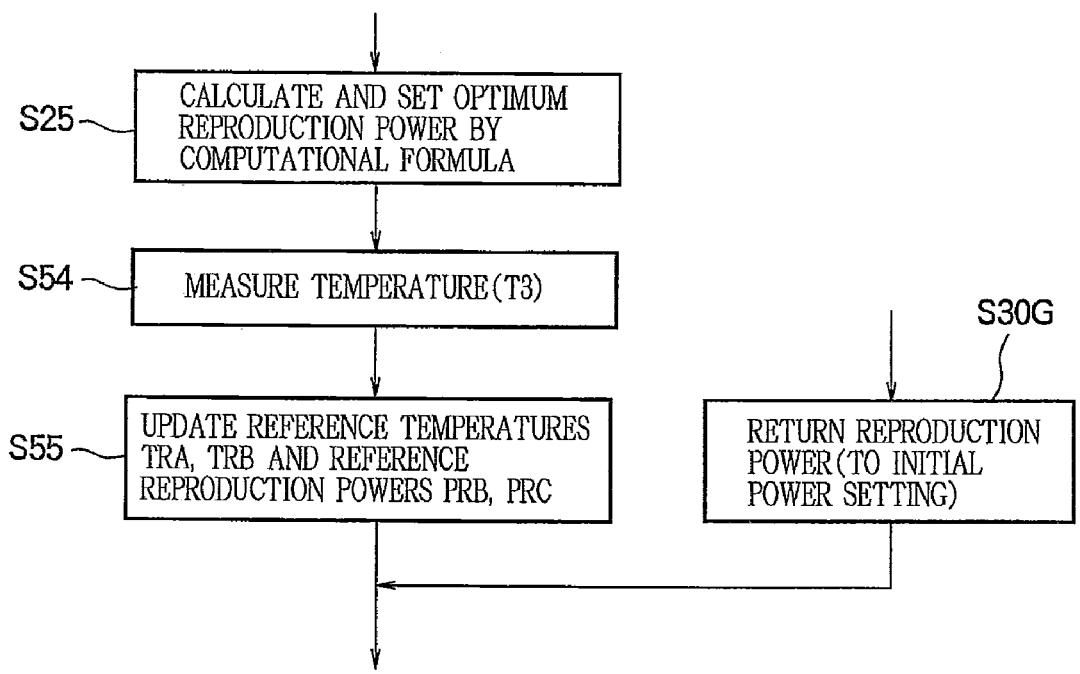
FIG. 21 is a flowchart illustrating an exemplary operating procedure in the reproduction power adjustment step S60 in FIG. 20.
FIG. 22 is a table illustrating exemplary minimum values of maximum reproduction powers at different temperatures.

The processing in step S60 is similar to the processing in step S30 described with reference to FIGS. 11 and 12 in relation to the second embodiment, but differs in that processing similar to the processing in steps S54 and S55 in FIG. 19 is performed after step S25 in FIG. 12. More specifically, as shown in FIG. 21, steps S54 and S55 are inserted after step S25 in FIG. 12; as described with reference to FIG. 19, the temperature T3 of the optical disc device 100 is measured by use of the temperature measurement unit 380 in step S54, and in step S55 the reference temperatures TRA and TRB are updated to the temperature T3 obtained in step S54 and the reference reproduction powers PRB and PRC are updated to the maximum reproduction power PRm obtained in step S25.

If there is a reproduction command in step S31, data of a designated size are read in step S32, starting at a designated address.

In step S33, whether the reproduction of the data has ended and a standby state has begun or not is decided, and if the standby state has begun (if Yes), reproduction power is adjusted in step S60.

Next, in step S43, whether the standby state will terminate or not is decided, and if the standby state will continue (if No), the reproduction power adjustment in step S60 continues. If the standby state will terminate in step S34 (if Yes), the process returns to step S31 to await a reproduction command from the host controller 400.

As can be seen, when the processing is performed in the procedure shown in FIG. 20, as in the second embodiment, the reproduction power adjustment is performed intermittently during the standby times in the reproducing of data. In some cases, as described in FIG. 11, the processing in step S60 is repeated to collect the test reproduction data required for the calculation of the optimum reproduction power while other processing is being carried out, such as data reproduction processing similar to the processing in step S32, for example.

When processing is performed by the procedure in FIG. 20 as well, if the temperature difference is equal to or greater than the prescribed temperature difference ΔTB (if Yes) in step S51, the reproduction power adjustment may be performed as in step S52 if, for example, data reproduction is halted but the power of the optical disc device 100 is left on. That is, following a No decision in step S31, the processing in step S52 and the subsequent steps in FIG. 19 may be performed.

As described above, in the fifth embodiment, since the reproduction power adjustment (steps S52 and S60) is performed if there is a large temperature change (equal to or greater than a prescribed temperature difference ΔTB) after the reproduction power adjustment in steps S15, S52, and/or S60, even if the relation between the maximum reproduction power PRm and temperature differs from the preset relation due to individual differences in optical disc devices 100 and optical discs 500 or other factors, the degradation count can be kept equal to or greater than the guaranteed reproduction count RL regardless of temperature variation.

In FIG. 20, during the reproduction power adjustment (test reproduction for this purpose) in step S52 or S60, no reproduction power correction is performed using equation (6A) or equation (6B) in step S43. But if the reproduction power adjustment is performed during a data reading standby time (when the processing in step S60 is performed following a No decision in step S31 in FIG. 20 or a Yes decision in step S33), the processing from step S42 to step S45 may be periodically performed and the result may be set as the reproduction power for reading data.

When the optimum reproduction power is calculated in step S52 in FIG. 19 or step S60 in FIG. 20, the slope CT used in equation (6A) or (6B) as the slope of the approximation line approximating the relation between temperature and maximum reproduction power may be recalculated by using the maximum reproduction power obtained in step S15, the temperature T1 obtained by measurement in step S50, the maximum reproduction power obtained in step S52 or step S60, and the temperature T3 obtained by measurement in step S54, and then used in the reproduction power correction in step S43.

In both the calculation of the optimum power responsive to temperature variation in the above step S52 or step S60 and the reproduction power correction in step S43, the reproduction power is changed responsive to temperature variation, so that these steps individually or in combination may referred to as changing the reproduction power.

Sixth Embodiment

In the third embodiment, the optimum reproduction power for an optical disc 500 is determined beforehand, such as before shipment or during the development of the optical disc device 100, and the determined value is stored in the ROM 220 in the optical disc device 100, but the temperature inside the optical disc device is not taken into account. The amount of signal quality degradation also varies with temperature, so that if the temperature inside the optical disc device 100 changes, the reproduction power determined in the third embodiment may cause more than the prescribed amount of signal degradation. Accordingly, in the sixth embodiment, in addition to the information in the third embodiment, information for addressing changes in temperature is also stored in the ROM 220 in the optical disc device 100, and the optimum reproduction power correction is performed responsive to temperature.

In the sixth embodiment, test reproduction as in the first or second embodiment is performed for individual disc specific information in various temperature environments in advance (within a range assumed as the guaranteed operating range of the optical disc device 100), the relation between the reproduction power used in the test reproduction and the natural logarithm of the reproduction count (degradation count) ND for a prescribed amount of degradation of signal quality is approximated by a curve represented by equation (4), and the optimum reproduction power at which the degradation of signal quality can be restricted to a prescribed amount or less at the guaranteed reproduction count RL is determined as a reference power. The slope of an approximation line is also determined from the relation between various (two or more different) temperatures (reference temperatures) and the optimum reproduction power (reference power) measured at those temperatures. The relation among the above determined optimum reproduction power (reference power), the temperature (reference temperature) at which the optimum reproduction power was determined, and the slope of the approximation line is associated with the disc specific information (identification information) as a temperature condition and stored in table form, for example, in the ROM 220 in the central control unit 200 in the optical disc device 100.

Next, the reproduction power setting procedure in the sixth embodiment will be described.

When an optical disc 500 is inserted into an optical disc device 100 for reproduction, the optical disc device 100 reads the specific information of the optical disc 500, and reads the optimum reproduction power corresponding to the same specific information as that of the inserted optical disc 500, together with the temperature at which the optimum reproduction power was obtained and the slope of the approximation line, from the table.

Then the temperature in the optical disc device 100 is measured by the temperature measurement unit 380, and the optimum reproduction power is calculated by using equation (6A) as in the fourth embodiment. In this calculation, PRou in equation (6A) is the optimum reproduction power to be determined, CT is the slope of the approximation line of the relation between temperature and the optimum reproduction power read from the table, T2 is the measured temperature, TRA is the temperature (reference temperature) read from the table, and PRB is the optimum reproduction power read from the table. The optimum reproduction power value obtained by this calculation is set, and then data are reproduced from the optical disc 500.

The optimum reproduction power, the temperature, and the slope of the approximation line are determined for the specific information of individual optical discs 500 in advance, before shipment of the optical disc device 100 (creating a table including the optimum reproduction power, temperature, and slope of the approximation line for each disc), and are stored in the ROM 220 in the optical disc device 100. This has to be done only when the model or specifications of the optical disc device 100 are changed (for example, when the optical specifications of the optical pickup 300 are changed).

When every optical disc has the same relation between temperature and the maximum reproduction power PRm, as shown in FIG. 17, information about the relation between temperature and maximum reproduction power PRm (the slope of the approximation line) need not be stored in the optical disc device 100 for the specific information of the optical discs individually; instead, a common value (or set of values) may be used for the specific information of all optical discs. If each optical disc has a different relation between temperature and maximum reproduction power PRm, as shown in FIG. 18, the relation between the temperature and the maximum reproduction power (the slope of the approximation line) is preferably stored for the individual specific information of the optical discs in the ROM 220 in the optical disc device 100.

For optical discs for which the relation between temperature and maximum reproduction power (the slope of the approximation line) cannot be stored, the optimum reproduction power is determined for each temperature as follows, instead of as above. That is, the maximum reproduction power is determined for each different optical disc. For example, in FIG. 18, at 0° C. the maximum reproduction power of Disc E, at 20° C. and 40° C. the maximum reproduction power of Disc G, and at 60° C. the maximum reproduction power of Disc F are 'the smallest of the maximum reproduction power values'.

In the ROM 220 in the optical disc device 100, the above smallest value (or the optimum reproduction power value corresponding to the smallest value) among the plurality of maximum reproduction power values respectively corresponding to the plurality of temperatures is stored in association with each of the plurality of temperatures. The values stored in the example shown in FIG. 18 are as shown in FIG. 22.

In performing reproduction with an optical disc device 100 in which such information is stored, if a value of the above optimum reproduction power is stored in association with the temperature obtained by measurement by the temperature measurement unit 380, that optimum reproduction power is used as the reproduction power setting, and if no value of the above optimum reproduction power is stored in association with the measured temperature, it suffices to determine the reproduction power setting corresponding to the measured temperature (current measured temperature) from the stored values of the optimum reproduction power by linear interpolation.

This method may be applied to the specific information of all optical discs.

In order to determine the optimum reproduction power, the temperature, and the slope of the approximation line for optical disc devices 100 before shipment of the optical disc devices, the optimum reproduction power, the temperature, and the slope of the approximation line may be determined by tests carried out using each individual optical disc device 100, or the optimum reproduction power, temperature, and slope of the approximation line may be obtained by using another optical disc device with the same specifications, or a test device with the same performance and characteristics.

The optimum reproduction power, temperature, and slope of the approximation line obtained in this way are stored in the ROM 220, for example, in the optical disc device to be shipped. When an optical disc is inserted, the optical disc device may read the optimum reproduction power, the temperature, and the slope of the approximation line from the ROM 220, and may perform the reading of control information and actual playing by using the optimum reproduction power setting as corrected by use of equation (6A), using the temperature of the optical disc device 100 at that time.

Alternatively, only the reading of the control information and other processing (in steps S13 and S14) may be performed by using the corrected setting of the optimum reproduction power, and then the reproduction power may be adjusted as in the first or second embodiment and the result may be written into the ROM 220. Alternatively, the optimum reproduction power may be corrected responsive to temperature variation (S43) or adjusted to determine the optimum reproduction power responsive to the temperature after a temperature change (S60) as in the fourth or fifth embodiment.

In order to determine the optimum reproduction power, the temperature, and the slope of the approximation line for the optical disc device 100 before shipment of the optical disc device, the method described in relation to the first or second embodiment may be used. But in order to determine the optimum reproduction power with higher accuracy, the reproduction power used in the test reproduction is preferably measured in a range including the low power region, curve region, and high power region in FIG. 8. It is also preferable to obtain the optimum reproduction power, the temperature, and the slope of the approximation line over the wide temperature range set as the guaranteed operating temperature range of the optical disc device 100, especially including high temperatures, which have a great impact on signal degradation.

In the sixth embodiment, the optimum reproduction power, the temperature at which the optimum reproduction power was determined, and the slope of the approximation line are stored for the specific information of individual optical discs in table form in the ROM 220 of the optical disc device 100. Regarding the slope of the approximation line, the test reproductions for obtaining the optimum reproduction power at different temperatures may be limited to several typical optical discs, the slopes of the approximation lines determined from the relation between the optimum reproduction power and the temperature may be determined, and then the same value, such as the mean value of the slopes of the plurality of approximation lines thus determined, may be used in all cases, regardless of the specific information of the individual optical disc. In this case, for an optical disc for which the optimum reproduction power has not been obtained at a plurality of temperatures, the optimum reproduction power only needs to be determined at one particular temperature. The temperature at which the optimum reproduction power is determined is preferably a high temperature causing significant signal degradation.

In the sixth embodiment, the optimum reproduction power, the temperature at which the optimum reproduction power was determined, and the slope of the approximation line are stored for the specific information of individual optical discs in table form in the ROM 220 of the optical disc device 100, but the optimum reproduction power values corresponding to different temperatures may be stored in table form in the ROM 220 of the optical disc device 100, and for a temperature that is not listed in the table, for example, the optimum reproduction power corresponding to a temperature higher temperature that is listed in the table may be used.

In the sixth embodiment, the optimum reproduction power, the temperature at which the optimum reproduction power was determined, and the slope of the approximation line are stored for the specific information of individual optical discs in table form in the ROM 220 of the optical disc device 100, but if the table is simplified by reducing the information stored therein, the slope of the approximation line may be determined so that for the optimum reproduction powers and the temperatures at which the optimum reproduction power was determined by investigation for the specific information of different optical discs, the degradation count ND will be equal to or greater than the guaranteed reproduction count RL for the specific information of all the optical discs investigated, by using the relation between temperature and the smallest maximum reproduction power value among the maximum reproduction power values of each of the plurality of optical discs at each temperature, and the optimum reproduction powers and the temperatures used may be stored in the ROM 220 of the optical disc device 100, so that the stored optimum reproduction power, the stored temperature at which the optimum reproduction power was determined, and the stored slope of the approximation line may be used for all optical discs. For example, in FIG. 17, the optimum reproduction power, the temperature at which the optimum reproduction power was determined, and the slope of the approximation line obtained from the results for Disc D are stored in the optical disc device 100, and are also used for Disc C.

Although the optimum reproduction power, the temperature at which the optimum reproduction power was determined, and the slope of the approximation line are stored in table form for the specific information of individual optical discs (in association with the specific identification information) and the reproduction power is corrected according to temperature by use of equation (6A), the present invention is not limited to this mode of operation. For example, the optimum reproduction power and temperature may be stored in the ROM 220 with respect to two different temperatures for the specific information of individual optical discs, and the slope may be calculated from the optimum reproduction powers for the two different temperatures, or another equation by which a correction equivalent to the correction in equation (6A) can be carried out from the optimum reproduction powers for the two different temperatures may be used.

Although the optimum reproduction power, the temperature at which the optimum reproduction power was determined, and the slope of the approximation line are stored for the specific information of individual optical discs in table form in the ROM 220 of the optical disc device 100, for example, the temperature conditions for the optimum reproduction powers stored in the ROM 220 of the optical disc device 100 may be made uniform regardless of the specific information of the optical discs, and the temperature at which the optimum reproduction power was determined may be stored in the ROM 220 of the optical disc device 100 without being associated with the specific information.

As described above, in the sixth embodiment, the optimum reproduction power, the temperature at which the optimum reproduction power was determined, and the slope of the approximation line are associated with the specific information of an optical disc and stored in table form, for example, in the ROM 220 of the optical disc device 100, the optimum reproduction power, the temperature at which the optimum reproduction power was determined, and the slope of the approximation line corresponding to the specific information of an inserted optical disc 500 and the temperature of the optical disc device 100 are read, and the optimum reproduction power is determined by using equation (6A), so that the amount of signal degradation can be reduced to a prescribed amount or less regardless of the temperature of the optical disc device 100.

In the third and sixth embodiments, the optimum reproduction power determined in advance is stored in the optical disc device 100, but the maximum reproduction power determined in advance may be stored instead. In this case, the optimum reproduction power is calculated by use of the stored maximum reproduction power and is used as the reproduction power setting.

The first to sixth embodiments have been described on the assumption that the optical disc 500 is a BD (Blu-ray disc), but these embodiments may be used in reproducing data from optical discs 500 of types other than the BD type, provided that data are reproduced from the optical disc 500 by irradiation with laser light.

Although the maximum reproduction power is determined and a power having an identical or slightly smaller value (allowing a margin) is set as the optimum reproduction power PRo in the first to sixth embodiments above, a reproduction power that is lower than the maximum reproduction power and at which the reproduction quality measured in a signal quality measurement process similar to step S22D in FIG. 3 becomes best may be determined and set as the optimum reproduction power PRo.

As described above, in the present invention, the relation between the reproduction power and the natural logarithm of the reproduction count (degradation count) at which the signal quality degrades by a prescribed amount is approximated by an integral function of the sigmoid function as in equation (4), so that even if data obtained from an accelerated test performed with high reproduction power are used, the optimum reproduction power (reproduction power at which the degradation of signal quality can be restricted to a prescribed amount or less at the guaranteed reproduction count RL) can be predicted accurately. Because accelerated testing with high reproduction power becomes possible, it is possible to minimize the necessary number of test reproductions, enabling faster prediction of the optimum reproduction power than when an Arrhenius plot is used.

As described in relation to the second embodiment with reference to FIGS. 11 and 12, or in relation to the fifth embodiment with reference to FIGS. 20 and 21, when the data are reproduced by repetitive alternation of reproduction periods during which data are read from the optical disc with standby periods lasting until the reading of the next data, the reproduction power adjustment is performed by using the standby periods, so that data can be reproduced from the optical disc without waiting for the optimum reproduction power to be determined by the reproduction power adjustment.

Storage of the optimum reproduction power (the reproduction power with which the degradation of signal quality can be restricted to a prescribed amount of degradation or less at the predetermined guaranteed reproduction count RL) together with disc-specific information in the optical disc device (in association with the specific information) enables it to be set to the optimum reproduction power without the need to perform test reproduction before reproduction from the disc.

By advance investigation of the relation between the maximum reproduction power (the reproduction power at which the degradation count ND reaches the guaranteed reproduction count) and temperature, and correction of the optimum reproduction power responsive to temperature variation by use of equation (6A) after a temperature change, even when the temperature in the optical disc device has changed, the optimum reproduction power at that temperature can be determined, preventing degradation of signal quality by the prescribed amount or more.

In the case of a major change of the temperature in the optical disc device, the reproduction power adjustment (including test reproduction) is repeated, so that even if the relation between the maximum reproduction power and temperature differs from the preset relation due to the individual differences between optical disc devices or optical discs or other factors, the degradation count can be kept equal to or greater than the guaranteed reproduction count RL despite the temperature change.

Storage of the optimum reproduction power, the temperature at which the optimum reproduction power was determined, and the slope of the approximation line approximating the relation between temperature and the maximum reproduction power together with the specific information of individual optical discs (in association with the specific information) in the optical disc device, for example, in its internal ROM 220, enables the reproduction power to be set to an appropriate value that deals with temperature variations in the optical disc device without performing a reproduction power adjustment (including test reproduction) before performing reproduction from the disc.

REFERENCE CHARACTERS 100 optical disc device, 110 preamplifier, 120 reproduced signal processing unit, 130 signal quality measurement unit, 140 data decoder, 170 laser controller, 180 servo controller, 181 spindle motor, 182 sled motor, 190 buffer memory, 200 central control unit, 210 CPU, 220 ROM, 230 RAM, 300 optical head, 310 semiconductor laser, 320 laser driving circuit, 330 collimating lens, 340 beam splitter, 350 objective lens, 360 detecting lens, 370 light receiving element, 400 host controller, 500 optical disc.

What is claimed is:

1. An optical disc reproduction power setting method for determining a reproduction power setting in an optical disc reproduction method for reproducing information from an optical disc by irradiating the optical disc with laser light, the optical disc reproduction power setting method comprising:
    a test reproduction step for carrying out test reproduction of an area in which information is recorded on the optical disc, using a test reproduction power higher than a laser light reproduction power used in reproduction from the optical disc;
    a life-span index calculating step for determining a reproduction time or reproduction count until reproduced signal quality degrades to a prescribed value in the test reproduction step as a life-span index; and
    a reproduction power determining step for determining, as an optimum reproduction power, from a relation between the life-span index and the test reproduction power when test reproduction is carried out using at least three mutually differing test reproduction powers, a laser light power such that even if reproduction from the optical disc is carried out for a prescribed time or count, an amount of degradation of the reproduced signal is equal to or less than the prescribed value, and using this power as a reproduction power setting; wherein
    the reproduction power determining step
    includes an approximation step for approximating the relation between the test reproduction power and the logarithm of the life-span index obtained in the life-span index calculating step with an approximation curve comprising
        a first straight line section having a form of a straight line asymptotically approaching a first slope,
        a second straight line section having a form of a straight line asymptotically approaching a second slope more gradual than the first slope, and having the same direction as the first slope, and
        a curve section that connects the first straight line section and the second straight line section, and
        based on the approximation curve obtained by the approximation step,
        a laser light power at which the amount of the degradation of the reproduced signal reproduced from the optical disc is equal to or less than the prescribed value after the optical disc has been reproduced for the prescribed reproduction time is determined as the optimum reproduction power.

2. The optical disc reproduction power setting method of claim 1, wherein the approximation step determines the approximation curve by approximating the relation between the life-span index LP and the test reproduction power PR by an equation $$\ln(LP) = f\{(LA-LD)/(1+\exp(LB \times PR-LC))+LD\}+LE$$

and adjusting constants LA, LB, LC, LD, and LE so as to minimize an overall difference between the life-span index LP at each value PR of the test reproduction power and the value on the approximation curve obtained from the equation.

3. The optical disc reproduction power setting method of claim 1, wherein the test reproduction powers are disposed in the second straight line section and the curve section.

4. The optical disc reproduction power setting method of claim 1, wherein the approximation step determines the approximation curve when a peak point and at least one data point positioned on each side thereof have been obtained as a result of differentiating the logarithm of the life-span index twice with respect to the test reproduction power, using results of the test reproduction step obtained so far.

5. The optical disc reproduction power setting method of claim 1, wherein the approximation step determines the approximation curve using results of the test reproduction step obtained so far, when there is no peak in a result of differentiating the logarithm of the life-span index twice with respect to the test reproduction power, the values obtained as the result of the differentiation being substantially zero, and a difference equal to or greater than a prescribed value is detected between mutually adjacent test reproduction power values in a result of differentiating the logarithm of the life-span index once with respect to the test reproduction power.

6. The optical disc reproduction power setting method of claim 1, wherein the area on the optical disc used for test reproduction in the test reproduction step is an area in which, among the information recorded on the optical disc, infrequently accessed data are stored.

7. The optical disc reproduction power setting method of claim 1, further comprising:
    a temperature measuring step for measuring temperature near a laser emitting the laser light, the temperature near the laser being measured as a first temperature while the optimum reproduction power is being determined in the reproduction power determining step or after the optimum reproduction power has been determined; and
    a reproduction power changing step for, when the temperature near the laser has changed by a prescribed amount or more from the first temperature, designating the optimum reproduction power at the temperature after the change, instead of the optimum reproduction power determined in the reproduction power determining step, as the reproduction power setting.

8. The optical disc reproduction power setting method of claim 7, wherein the reproduction power changing step includes a reproduction power correcting step for correcting the optimum reproduction power determined in the reproduction power determining step responsive to the temperature change, and when the temperature near the laser has changed from the first temperature by a first prescribed amount or more, the reproduction power correcting step corrects the optimum reproduction power determined in the reproduction power determining step to an optimum reproduction power corresponding to the temperature after the change by the first prescribed amount or more, from a predetermined relation between reproduction power and temperature.

9. The optical disc reproduction power setting method of claim 8, wherein the reproduction power correcting step performs the correction to the optimum reproduction power corresponding to the temperature after the change by the first prescribed amount or more on a basis of an approximation line determined in advance as a linear approximation to a relation between the optimum reproduction power and temperature.

10. The optical disc reproduction power setting method of claim 9, wherein:

a plurality of approximation lines linearly approximating a relation between the optimum reproduction power and temperature for each of a plurality of optical discs are determined in advance;

a slope of an approximation line having a slope of maximum absolute value among the plurality of approximation lines is set as a first slope;

a slope of an approximation line having a slope of minimum absolute value among the plurality of approximation lines is set as a second slope; and the reproduction power correcting step
performs the correction to the optimum reproduction power corresponding to the temperature after the change by the first prescribed amount or more
by using the first slope if the temperature after the change by the first prescribed amount or more is higher than the first temperature, and
by using the second slope if the temperature after the change by the first prescribed amount or more is lower than the first temperature.

11. An optical disc reproduction method for reproducing information from the optical disc by using laser light with the power set by the reproduction power setting method of claim 1.

12. An optical disc device for reproducing information from an optical disc by irradiating the optical disc with laser light, the optical disc device comprising:

a test reproduction unit configured to carry out test reproduction of an area in which information is recorded on the optical disc, using a test reproduction power higher than a laser light reproducing power used in reproduction from the optical disc;

a life-span index calculating unit configured to determine a reproduction time or reproduction count until reproduced signal quality degrades to a prescribed value in the test reproduction unit as a life-span index; and a reproduction power determining unit configured to determine, as an optimum reproduction power, from a relation between the life-span index and the test reproduction power for test reproductions using at least three mutually differing test reproduction powers, a laser light power such that even if reproduction of the optical disc is carried out for the prescribed time or count, an amount of degradation of the reproduced signal is equal to or less than the prescribed value, and use this power as a reproduction power setting; wherein the reproduction power determining unit includes an approximation unit configured to approximate the relation between the test reproduction power and the logarithm of the life-span index obtained by the life-span index calculating unit with an approximation curve comprising a first straight line section having a form of a straight line asymptotically approaching a first slope, a second straight line section having a form of a straight line asymptotically approaching a second slope more gradual than the first slope, and having the same direction as the first slope, and a curve section that connects the first straight line section and the second straight line section, and based on the approximation curve obtained by the approximation unit, a laser light power at which the amount of the degradation of the reproduced signal reproduced from the optical disc is equal to or less than the prescribed value after the optical disc has been reproduced for the prescribed reproduction time is determined as the optimum reproduction power.

13. The optical disc device of claim 12, wherein the approximation unit determines the approximation curve by approximating the relation between the life-span index LP and the test reproduction power PR by an equation $$\ln(LP) = f\{(LA-LD)/(1+\exp(LB \times PR-LC)) + LD\} + LE$$

and adjusting constants LA, LB, LC, LD, and HE so as to minimize an overall difference between the life-span index LP at each value PR of the test reproduction power and the value on the approximation curve obtained from the equation.

14. The optical disc device of claim 12, wherein the test reproduction powers are disposed in the second straight line section and the curve section.

15. The optical disc device of claim 12, wherein the approximation unit determines the approximation curve when a peak point and at least one data point positioned on each side thereof have been obtained as a result of differentiating the logarithm of the life-span index twice with respect to the test reproduction power, using results of the test reproduction unit obtained so far.

16. The optical disc device of claim 12, wherein the approximation unit determines the approximation curve using results of the test reproduction obtained so far by the test reproduction unit, when there is no peak in a result of differentiating the logarithm of the life-span index twice with respect to the test reproduction power, the values obtained as the result of the differentiation being substantially zero, and a difference equal to or greater than a prescribed value is detected between mutually adjacent test reproduction power values in a result of differentiating the logarithm of the life-span index once with respect to the test reproduction power.

17. The optical disc device of claim 12, wherein the area on the optical disc used for test reproduction by the test reproduction unit is an area in which, among the information recorded on the optical disc, infrequently accessed data are stored.

18. The optical disc device of claim 12, further comprising:
a temperature measuring unit configured to measure temperature in the optical disc device, the temperature in the optical disc device being measured as a first temperature while the optimum reproduction power is being determined by the reproduction power determining unit or after the optimum reproduction power has been determined; and
a reproduction power changing unit configured to, when the temperature in the optical disc device has changed by a prescribed amount or more from the first temperature, designate the optimum reproduction power at the temperature after the change, instead of the optimum reproduction power determined by the reproduction power determining unit, as the reproduction power setting,
wherein the reproduction power changing unit includes a reproduction power correcting unit configured to correct the laser light power determined by the reproduction power determining unit responsive to the temperature change, and
when the temperature in the optical disc device has changed from the first temperature by the first prescribed amount or more, the reproduction power correcting unit corrects the optimum reproduction power determined by the reproduction power determining unit to an optimum reproduction power corresponding to the temperature after the change by the first amount or more, from a predetermined relation between reproduction power and temperature.

19. The optical disc device of claim 18, wherein the reproduction power correcting unit performs the correction to an optimum reproduction power corresponding to the temperature after the change by the first prescribed amount or more on a basis of an approximation line determined in advance as a linear approximation to a relation between the optimum reproduction power and temperature.

20. The optical disc device of claim 19, wherein:
a plurality of approximation lines linearly approximating the relation between the optimum reproduction power and temperature for each of a plurality of optical discs are determined in advance;
a slope of an approximation line having a slope of maximum absolute value among the plurality of approximation lines is set as a first slope;
a slope of an approximation line having a slope of minimum absolute value among the plurality of approximation lines is set as a second slope; and
the reproduction power correcting unit performs the correction to the optimum reproduction power corresponding to the temperature after the change by the first prescribed amount or more
by using the first slope if the temperature after the change by the first prescribed amount or more is higher than the first temperature, and
by using the second slope if the temperature after the change by the first prescribed amount or more is lower than the first temperature.

* * * * *